United States Patent
Yu et al.

(10) Patent No.: US 10,141,986 B2
(45) Date of Patent: Nov. 27, 2018

(54) METHOD AND APPARATUS FOR TRANSMITTING AND RECEIVING SIGNAL THROUGH BEAMFORMING IN COMMUNICATION SYSTEM

(71) Applicant: Samsung Electronics Co., Ltd., Suwon-si, Gyeonggi-do (KR)

(72) Inventors: Hyunkyu Yu, Suwon-si (KR); Hyukmin Son, Hanam-si (KR); Jaewon Kim, Seoul (KR); Jeehwan Noh, Suwon-si (KR); Hyunseok Ryu, Yongin-si (KR); Hyunil Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/487,926

(22) Filed: Apr. 14, 2017

(65) Prior Publication Data

US 2017/0302341 A1 Oct. 19, 2017

Related U.S. Application Data

(60) Provisional application No. 62/322,412, filed on Apr. 14, 2016, provisional application No. 62/326,233, (Continued)

(30) Foreign Application Priority Data

Oct. 7, 2016 (KR) .................. 10-2016-0130039

(51) Int. Cl.
*H04B 7/02* (2018.01)
*H04B 7/0417* (2017.01)
(Continued)

(52) U.S. Cl.
CPC ......... *H04B 7/0417* (2013.01); *H04B 7/0617* (2013.01); *H04B 7/0639* (2013.01);
(Continued)

(58) Field of Classification Search
CPC ............. H04W 16/28; H04W 72/0446; H04W 74/006; H04W 76/025; H04W 72/0413;
(Continued)

(56) References Cited

U.S. PATENT DOCUMENTS

2013/0072243 A1 3/2013 Yu et al.
2013/0172002 A1* 7/2013 Yu ..................... H04W 72/046
455/452.1
(Continued)

FOREIGN PATENT DOCUMENTS

KR 2015-0016913 A 2/2015
WO 2013-085523 A1 6/2013
WO 2015-157565 A1 10/2015

*Primary Examiner* — Khanh C Tran
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A signal transmission and reception method implemented by a terminal of a mobile communication system is provided. The terminal receives first information including a request for beam related information from a base station and transmits second information including the beam related information based on the first information to the base station. The terminal changes at least one of a Tx beam or a Rx beam (Continued)

associated with the base station, based on the first information and the second information.

15 Claims, 23 Drawing Sheets

Related U.S. Application Data filed on Apr. 22, 2016, provisional application No. 62/334,735, filed on May 11, 2016, provisional application No. 62/343,063, filed on May 30, 2016.

(51) Int. Cl.
    *H04B 7/06*     (2006.01)
    *H04W 72/04*     (2009.01)
    *H04B 7/08*     (2006.01)

(52) U.S. Cl.
    CPC .......... *H04B 7/0695* (2013.01); *H04B 7/088* (2013.01); *H04W 72/046* (2013.01); *H04W 72/0446* (2013.01)

(58) Field of Classification Search
    CPC .......... H04W 72/085; H04W 72/1284; H04W 72/1289; H04W 52/0245; H04W 64/006; H04W 72/042; H04B 7/0617; H04B 7/0408; H04B 7/0695; H04B 7/0619; H04B 7/0413; H04B 7/0669; H04B 7/0626; H04B 7/0628; H04B 7/0632; H04B 7/088; H04L 25/0202; H04L 5/0023

See application file for complete search history.

(56) References Cited

U.S. PATENT DOCUMENTS

| | | | |
|---|---|---|---|
| 2013/0258885 A1 | 10/2013 | Yu et al. | |
| 2015/0349866 A1 | 12/2015 | Benjebbour et al. | |
| 2015/0351135 A1* | 12/2015 | Schmidt | H04W 76/02 455/450 |
| 2016/0087877 A1* | 3/2016 | Ryu | H04W 76/026 370/329 |
| 2016/0197659 A1 | 7/2016 | Yu et al. | |
| 2017/0244513 A1* | 8/2017 | Pitakdumrongkija | H04L 1/0003 |

\* cited by examiner

METHOD AND APPARATUS FOR TRANSMITTING AND RECEIVING SIGNAL THROUGH BEAMFORMING IN COMMUNICATION SYSTEM

CROSS-REFERENCE TO RELATED APPLICATION(S)

This application claims the benefit under 35 U.S.C. § 119(e) of a U.S. Provisional application filed on Apr. 14, 2016 in the U.S. Patent and Trademark Office and assigned Ser. No. 62/322,412, a U.S. Provisional application filed on Apr. 22, 2016 in the U.S. Patent and Trademark Office and assigned Ser. No. 62/326,233, a U.S. Provisional application filed on May 11, 2016 in the U.S. Patent and Trademark Office and assigned Ser. No. 62/334,735, and a U.S. Provisional application filed on May 30, 2016 in the U.S. Patent and Trademark Office and assigned Ser. No. 62/343,063, and under 35 U.S.C. § 119(a) of a Korean patent application filed on Oct. 7, 2016 in the Korean Intellectual Property Office and assigned Serial number 10-2016-0130039, the entire disclosure of each of which is hereby incorporated by reference.

TECHNICAL FIELD

The present disclosure relates to a method for transmitting and receiving information for signal transmission and reception through beamforming in a communication system and to an apparatus using the method. More particularly, the present disclosure relates to a method for changing at least one of a transmitting beam or a receiving beam in each node that transmits and receives signals in a communication system using beamforming, and an apparatus using the same.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System.'

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Additionally, beamforming may be applied to the digital domain and the analog domain in a base station or a terminal of the communication system. Also, analog beamforming requires a suitable beam to be applied, and there is a need of a method and apparatus for effectively transmitting and receiving such information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting and receiving beam change and control information for operation of analog beamforming in a communication system. Additionally, embodiments of the present disclosure provide operating methods of a base station and terminal for transmitting and receiving beam change and control information for operation of analog beamforming to achieve a high data transmission rate, and an apparatus using the same.

In accordance with an aspect of the present disclosure, a signal transmission and reception method implemented by a terminal of a mobile communication system is provided. The method includes receiving first information including a request for beam related information from a base station, transmitting second information including the beam related information based on the first information to the base station, and changing at least one of a transmitting (Tx) beam or a receiving (Rx) beam associated with the base station, based on the first information and the second information.

In accordance with another aspect of the present disclosure, a signal transmission and reception method implemented by a base station of a mobile communication system is provided. The method includes transmitting first information including a request for beam related information to a terminal, receiving second information including the beam related information based on the first information from the terminal, and changing at least one of a Tx beam or a Rx beam associated with the terminal, based on the first information and the second information.

In accordance with another aspect of the present disclosure, a terminal of a mobile communication system is provide. The terminal includes a transceiver configured to transmit and receive signals and a controller configured to control the transceiver, to receive first information including a request for beam related information from a base station, to transmit second information including the beam related information based on the first information to the base station, and to change at least one of a Tx beam or a Rx beam associated with the base station, based on the first information and the second information.

In accordance with another aspect of the present disclosure, a base station of a mobile communication system is provided. The base station includes a transceiver configured to transmit and receive signals and a controller configured to control the transceiver, to transmit first information including a request for beam related information to a terminal, to receive second information including the beam related information based on the first information from the terminal, and to change at least one of a Tx beam or a Rx beam associated with the terminal, based on the first information and the second information.

According to embodiments of the present disclosure, in a communication system, each node may efficiently exchange at least one of beam change information and control information for applying beamforming, and thus a beam suitable for a channel environment may be managed, selected, and applied so as to improve communication efficiency.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
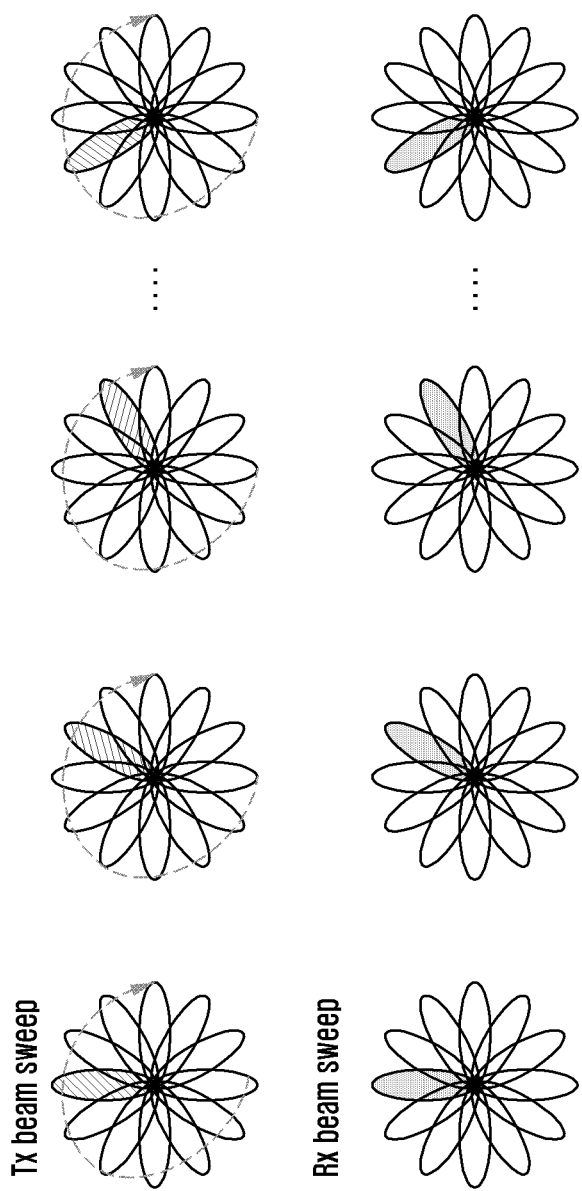
FIG. 1 is a diagram illustrating a beamforming operation in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, terms are defined in consideration of functions of the present disclosure and may be varied depending on user or operator's intention or custom. Therefore, the definition should be made based on the contents throughout this description. For the same reason, some elements are exaggerated, omitted or schematically shown in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the present disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Meanwhile, although embodiments disclosed herein are described for a communication system to which beamforming is applied, this is exemplary only and not to be construed as a limitation. The subject matters of embodiments may be also applied in general to any other communication system.

Additionally, information transmitted and received for a beam control in embodiments may include information transmitted and received for a beam change. That is, a beam control may be interpreted as including a beam change.

FIG. 1 is a diagram illustrating a beamforming operation in a wireless communication system according to an embodiment of the present disclosure.

Referring to FIG. 1, the wireless communication system includes a plurality of nodes (e.g., a base station and a plurality of terminals), and one node may find an optimal beam for wireless communication with a counterpart node and then set the optimal beam so as to transmit and receive data. In an embodiment, at least one of analog beamforming and digital beamforming may be applied for beamforming. The analog beamforming may be performed by adjusting the shape and direction of a beam by using a difference in amplitude and phase of a carrier signal in a radio frequency (RF) band. The digital beamforming may process a signal by applying each weight vector to a digitized signal, so that an RF signal from each antenna is passed to a digital band through a separate RF transceiver. The digital beamforming may realize beamforming through digital signal processing, thus generating a sophisticated beam that meets a demand for communication according to signal processing capability.

Each node may form a transmitting (Tx) beam and a receiving (Rx) beam. In order for each node to find a suitable beam for communication, a full beam sweep may be performed with regard to all of the Tx beams and the Rx beams as shown in FIG. 1. A process of finding an optimal beam for a counterpart node may be referred to as beam searching, and an associated reference signal may be transmitted and received for this process.

In embodiments, the reference signal may include a cell-specific reference signal and a terminal-specific reference signal, each of which may be transmitted periodically or aperiodically. As examples of the reference signal, there are a beam reference signal (BRS) and a beam refinement reference signal (BRRS).

In an embodiment, the BRS may be a cell-specific reference signal and be transmitted periodically. Also, in an embodiment, the BRRS may be a terminal-specific reference signal and be transmitted aperiodically. In another embodiment, the BRRS is a terminal-specific reference signal, and the allocation of the BRRS may be static or semi-static. In this case, the BRRS may be transmitted periodically or aperiodically within an allocated period.

In an embodiment, the terminal may measure at least one of the BRS and the BRRS transmitted from the base station and then report information about specific beams among them to the base station. This information reported to the base station may include at least one of the following:

BRS-based beam state information (BSI): A beam index (BI) of a beam and quality information of a beam (for example, beam reference signal received power (BRSRP), beam reference signal quality (BRSRQ), and beam received signal strength indicator (BRSSI))

BRRS-based beam refinement information (BRI): a BRRS resource index (BRRS-RI) for identifying a BRRS beam and quality information of a beam (for example, BRRS received power (BRRS-RP))

Such information about beams may be transmitted through an uplink channel, especially, at least one of an uplink control channel and an uplink data channel, transmitted from the terminal to the base station. Through a signaling process in which the base station requests a report about beam information from the terminal and then the terminal transmits information about specific beams in response to the request, the base station maintains and updates the beam information for each terminal. Described in embodiments of this disclosure are methods and apparatuses for performing a beam change in accordance with a command of the base station. The base station inserts control information having this command into a control message and sends the control message to the terminal. The beam change command will be described using downlink control information (DCI) or medium access control-control element (MAC-CE) as examples on the long term evolution (LTE) basis, and there is no limitation on the type of control message used.

The base station may configure a common beam list for a beam change of at least one of the base station and the terminal, based on BSI or BRI reported from the terminal. In embodiments, configuring or updating the beam list may be performed through one or more of the following two schemes.

Update scheme 1: The terminal reports periodically or aperiodically information about the best N beams to the base station, based on at least one of measured BRSRP and BRRS-RP. Through this, the terminal and the base station may maintain information about the best N beams and also update the maintained information. In embodiments, a number N may be a predetermined natural number and may be variably applied through exchange of information between the base station and the terminal. Also, the number N channels may be flexibly adjusted depending on a channel environment.

Update scheme 2: The base station receives periodically or aperiodically information about the best N beams from the terminal, creates a beam list by applying a predetermined rule based on the received information, and updates the beam list by transmitting information about the created beam list to the terminal.

In case of the update scheme 1, the information for applying the beam list may be exchanged between the base station and the terminal without additional signaling. In case of the update scheme 2, the base station shares the information about the beam list with the terminal through specific signaling or message transmission. Even in case of the update scheme 1, the base station may share modified beam list information for a specific purpose with the terminal. Thus, the beam list may be maintained and updated by applying at least one of the update schemes 1 and 2.

Specific signaling or message transmission is possible for the base station to transmit information related to the beam list to the terminal, and the following schemes may be applied.

A scheme of transmitting the beam list related information to the terminal by using at least one of MAC-CE, DCI, and upper layer signaling including at least one of radio resource control (RRC) and system information (SI)

In case of downlink (DL) DCI+xPDSCH (physical downlink shared channel), a scheme of transmitting the beam list related information to the terminal by using the xPDSCH transmitted from the base station to the UE based on DL grant allocated in the DCI In case of uplink (UL) DCI+xPUSCH (physical uplink shared channel), a scheme of transmitting the beam list related information through the DCI and receiving acknowledgment (ACK)/non-acknowledgment (NACK) information from the terminal through the xPUSCH In case of UL DCI+xPUCCH (physical uplink control channel), a scheme of transmitting the beam list related information through the DCI and receiving ACK/NACK information from the terminal through the xPUCCH Indication information that is additionally required while transmitting the beam list information may be simultaneously transmitted with the same signal or separately transmitted with other signal. For example, when the base station indicates a specific beam, or a beam set, to be applied to a beam change in the beam list, the base station may transmit such indication information necessary for a beam change to the terminal.

In embodiments, the DCI may be transmitted from the base station to the terminal via a physical downlink control channel (xPDCCH).

Also, in embodiments, xPDSCH, xPUSCH, xPUCCH, and xPDCCH may be one variation of, or have the same configuration as, PDSCH, PUSCH, PUCCH, and PDCCH, respectively.

In an embodiment, when the beam list related information is transmitted to the terminal through the MAC-CE, a bitmap may be used for indication of each beam contained in the list. The arranging order in the bitmap may be changed according to decoding. The size of each field may be changed. An example of each field is as follows.

| $B_7$ | $B_6$ | $B_5$ | $B_4$ | $B_3$ | $B_2$ | $B_1$ | R |
|---|---|---|---|---|---|---|---|
| R | Bl | Quality Information 1 | | | | | |
| R | Bl | Quality Information 2 | | | | | |
| R | Bl | Quality Information 3 | | | | | |
| R | Bl | Quality Information 4 | | | | | |
| ... | | | | | | | |
| R | Bl | Quality Information 6 | | | | | |
| R | Bl | Quality Information 7 | | | | | |

In an embodiment, the xPUSCH may be the same channel as or a similar channel to the PUSCH. Also, the xPUCCH may be the same channel or a similar channel to the PUCCH.

TABLE 1

| Indication bits | Beam indication |
|---|---|
| 00 | # 1 |
| 01 | # 3 |
| 10 | # 2 |
| 11 | # 7 |

Table 1 shows an example of a beam list according to an embodiment of the present disclosure. The indication bit is information transmitted to indicate a beam contained in the beam list, and the beam indication denotes a beam index corresponding to the indication bit.

When the beam list is shared between the base station and the terminal, the base station may use the beam list to indicate a beam as a specific use. For example, the base station may designate a specific beam to indicate a change to the specific beam, or designate an unavailable beam for the terminal to control a change to the unavailable beam. In an embodiment, two bits may be used to indicate a beam, and this may be applied variably. Also, the beam index corresponding to each indication bit may be updated when there is a report of the terminal or a need of the base station. Specifically, a corresponding relationship between the indication bit and the beam indication may be updated based on the beam related information reported by the terminal. For example, when the base station transmits control information including the indication bits of 01 to the terminal for a beam change, the terminal may use, based on the control information, a beam corresponding to #3 in signal transmission/reception with the base station.

Additionally, in an embodiment, at least one of the base station and the terminal may perform a beam change applied to communication therebetween in response to the transmission of the beam list information. For example, the base station may transmit a beam list to the terminal such that the terminal and the base station will change a beam according to an index (#1 in Table 1) indicated by the uppermost bit (00 in Table 1) from a specific time point after the transmission of the beam list. The beam change may be applied selectively to the whole channels or a specific channel group.

TABLE 2

| Indication bits | Beam indication |
| --- | --- |
| 00 | UL: # 2, DL: # 1 |
| 01 | UL: # 1, DL: # 3 |
| 10 | UL: # 3, DL: # 2 |
| 11 | UL: # 7, DL: # 7 |

Table 2 shows another example of a beam list according to an embodiment of the present disclosure. The indication bit is information transmitted to indicate a beam contained in the beam list, and the beam indication denotes a beam index corresponding to the indication bit. In embodiments, each indication bit may indicate different or same UL and DL beams. In this example, a UL beam list and a DL beam list are used separately, and the base station may transmit information about two beam lists to the terminal.

When the beam list is shared between the base station and the terminal, the base station may use the beam list to indicate a beam as a specific use. For example, the base station may indicate a specific beam and change a beam to the indicated beam. Also, the base station may indicate an unavailable beam for the terminal and control a use of the unavailable beam by the terminal.

In an embodiment, when the base station transmits the indication bit of 10 to the terminal, the terminal may apply a beam corresponding to #3 to UL and apply a beam corresponding to #2 to DL.

Additionally, in an embodiment, at least one of the base station and the terminal may perform a beam change applied to communication therebetween in response to the transmission of the beam list information. For example, the base station may transmit a beam list to the terminal and, from a specific time point after the transmission of the beam list, the terminal and the base station may change a beam to a specific beam corresponding to a particular index in the beam list. For example, the terminal and the base station may change a beam to a specific beam corresponding to #1 indicated by 00 in the first channel group (e.g., DL) from a specific time point, and also change a beam to a specific beam corresponding to #1 indicated by 01 in the second channel group (e.g., UL) from a specific time point. The channel group may be applied variously as will be discussed in the following embodiments, and a changed beam may be applied to only a certain channel such as a control channel or a data channel in DL or UL.

In an embodiment, when the base station needs to receive data signals of all users in one beam for UL multi-user's multiplexing, the base station may temporarily instruct the users for multiplexing to change to the same base station beam. After UL data transmission/reception is completed, each user may perform a beam change to a previously used beam or a new optimal beam. This embodiment may be utilized when the base station or a plurality of terminals need a common beam change in addition to case of an uplink multi-user multiple-input multiple-output (MIMO) (UL MU-MIMO).

Also, in an embodiment, when a beam list management is performed based on four lists as shown in Table 2, some indexes may provide beam information for the first group and other indexes may provide beam information for the second group. For example, indication bits 00 and 10 may include beam information for the first group, and indication bits 10 and 11 may include beam information for the second group. In this case, the beam information of each group may be updated through the same signal or separately.

A beam may be set to be changed to an index (#1 in Table 1) indicated by the uppermost bit (00 in Table 1). A beam change may be selectively applied to the whole channels or only a specific channel group.

Since two beam lists are used in this embodiment, the base station may perform further signaling of information about which beam to be indicated in which beam list.

Also, depending on how the indication bit is transmitted, whether to indicate a UL beam or a DL beam may be determined. For example, when the indication bit is transmitted through the DL DCI, only a beam corresponding to DL may be changed to a DL beam corresponding to the indication bit. Similarly, when the indication bit is transmitted through the UL DCI, only a beam corresponding to UL may be changed to a UL beam corresponding to the indication bit.

Additionally, in an embodiment, the beam index may be signaled based on at least one of a position, a port index, and a sequence index of at least one of time and frequency resources of a specific signal. In an embodiment, the specific signal may include at least one of a reference signal and a sync signal. The reference signal may include a channel state information reference signal (CSI-RS), and the sync signal may be a signal for synchronizing the base station and the terminal.

Further, in an embodiment, the beam index may be signaled to include information that a quasi co-location (QCL) relationship is established between an antenna port of a data channel, a control channel, or a demodulation reference signal (DMRS) transmitted together and at least one of a position, an antenna port index, and a sequence index of at least one of time and frequency resources of the specific signal in view of the Rx beam. This information may be signaled with the beam index.

Figure 2:
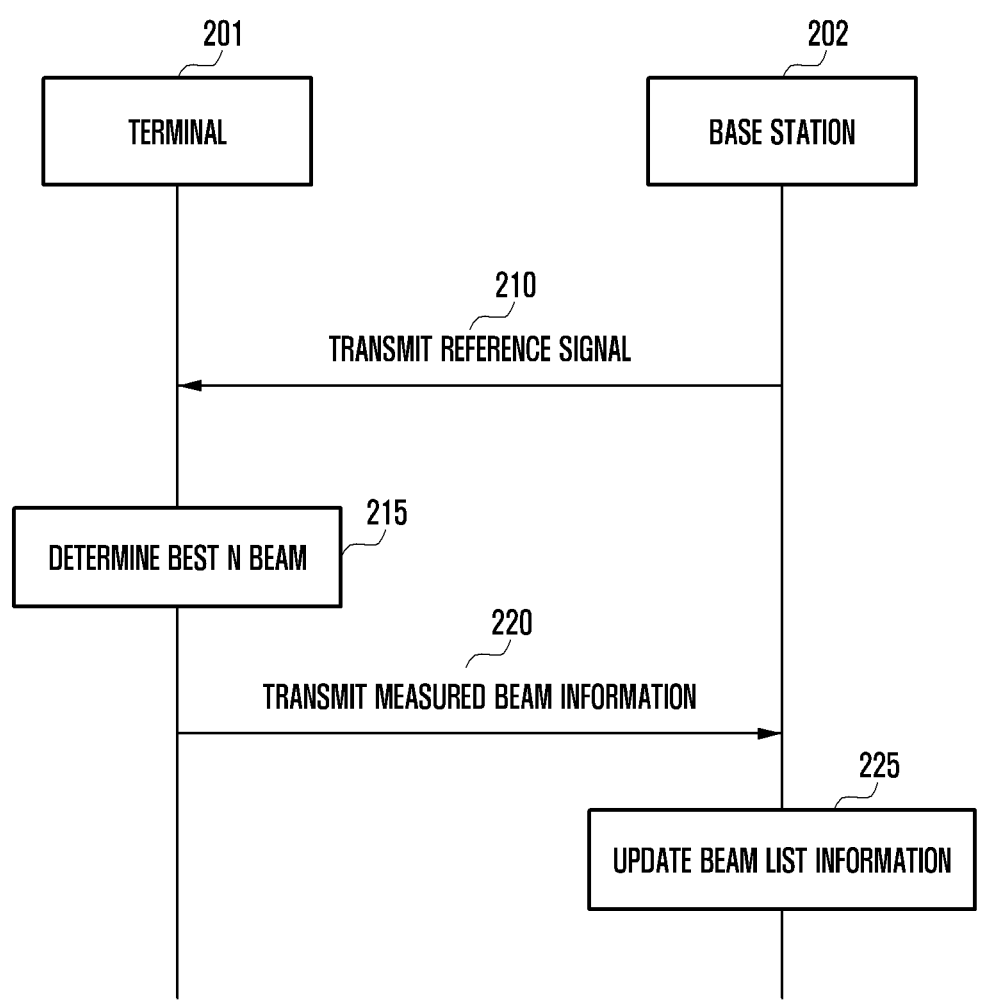
FIG. 2 is a diagram illustrating a method for managing a beam list according to an embodiment of the present disclosure.

FIG. 2 is a diagram illustrating a method for managing a beam list according to an embodiment of the present disclosure.

Referring to FIG. 2, in an embodiment, a terminal 201 may transmit and receive signals with a base station 202.

At operation 210, the base station 202 may transmit a reference signal to the terminal 201. In an embodiment, the reference signal may include at least one of BRS and BRRS.

At operation 215, the terminal 201 may determine the best N beams, based on the received reference signal. In an embodiment, a number N may be a natural number which is predetermined between the base station 202 and the terminal 201.

At operation 220, the terminal 201 may transmit measured beam information to the base station 202. In an embodiment, the terminal 201 may transmit information about some or all of the best N beams.

At operation 225, the base station 202 may update beam list information, based on the received information. In an embodiment, the same beam list is managed between the terminal 201 and the base station 202, and based on this, an index of a beam to be changed upon a beam change may be indicated.

Figure 3:
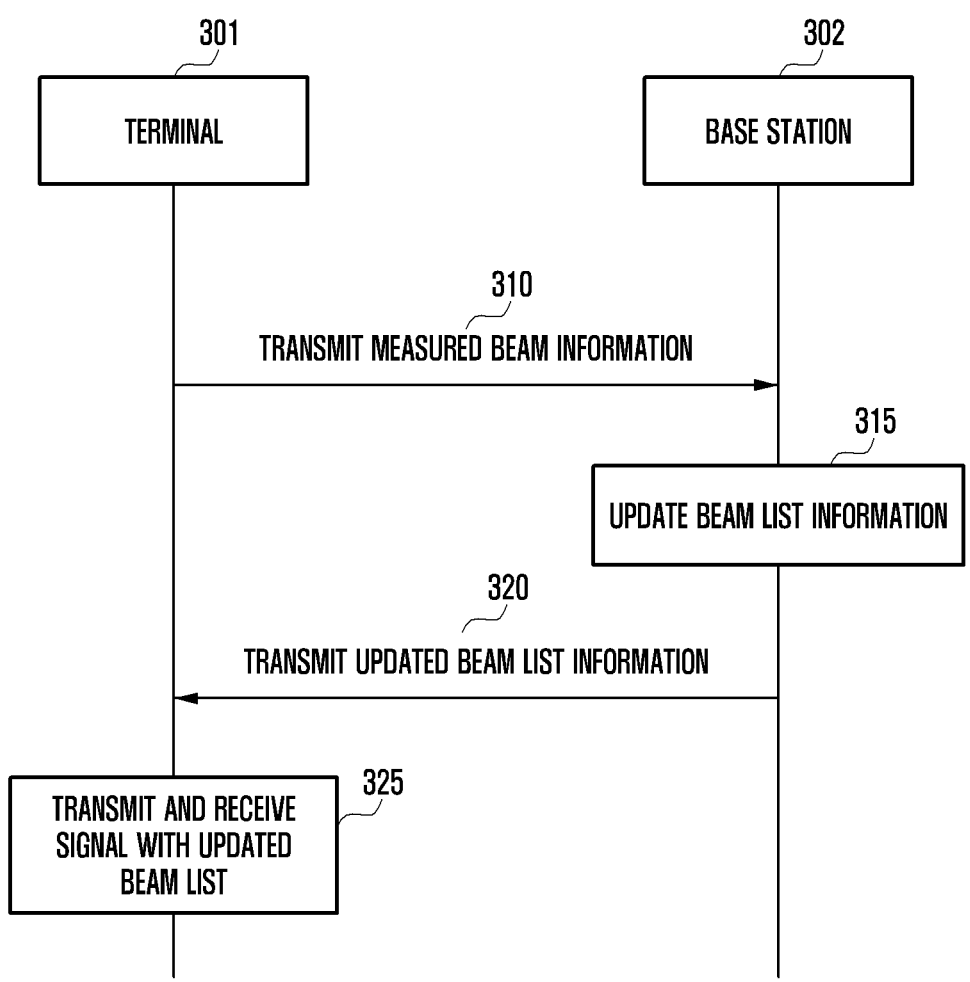
FIG. 3 is a diagram illustrating a method for managing a beam list according to an embodiment of the present disclosure.

FIG. 3 is a diagram illustrating a method for managing a beam list according to an embodiment of the present disclosure.

Referring to FIG. 3, a terminal 301 and a base station 302 may transmit and receive signals.

At operation 310, the terminal 301 may transmit measured beam information to the base station 302. In an embodiment, the terminal 301 may create beam information, based on a reference signal received from the base station 302, or may change information partly in a previously managed beam list and then transmit the beam information to the base station 302.

At operation 315, the base station 302 may update beam list information, based on the received information. In an embodiment, the beam list may contain N beams determined based on information transmitted and received between the terminal 301 and the base station 302. Index information indicating each beam may be created.

At operation 320, the base station 302 may transmit the updated beam list information to the terminal 301. The updated beam list information may be transmitted with an upper layer signal including RRC or SIB, or transmitted through a downlink data channel or a downlink control channel According to an embodiment, the updated beam list may be transmitted through a MAC-CE.

At operation 325, the terminal 301 may transmit and receive signals to and from the base station 302, based on the received beam list information.

The terminal 301 may perform resource allocation on a downlink (DL) or uplink (UL) channel, based on DCI transmitted from the base station 302. Hereinafter, a beam change method based on the DCI will be described as an embodiment.

Figure 4:
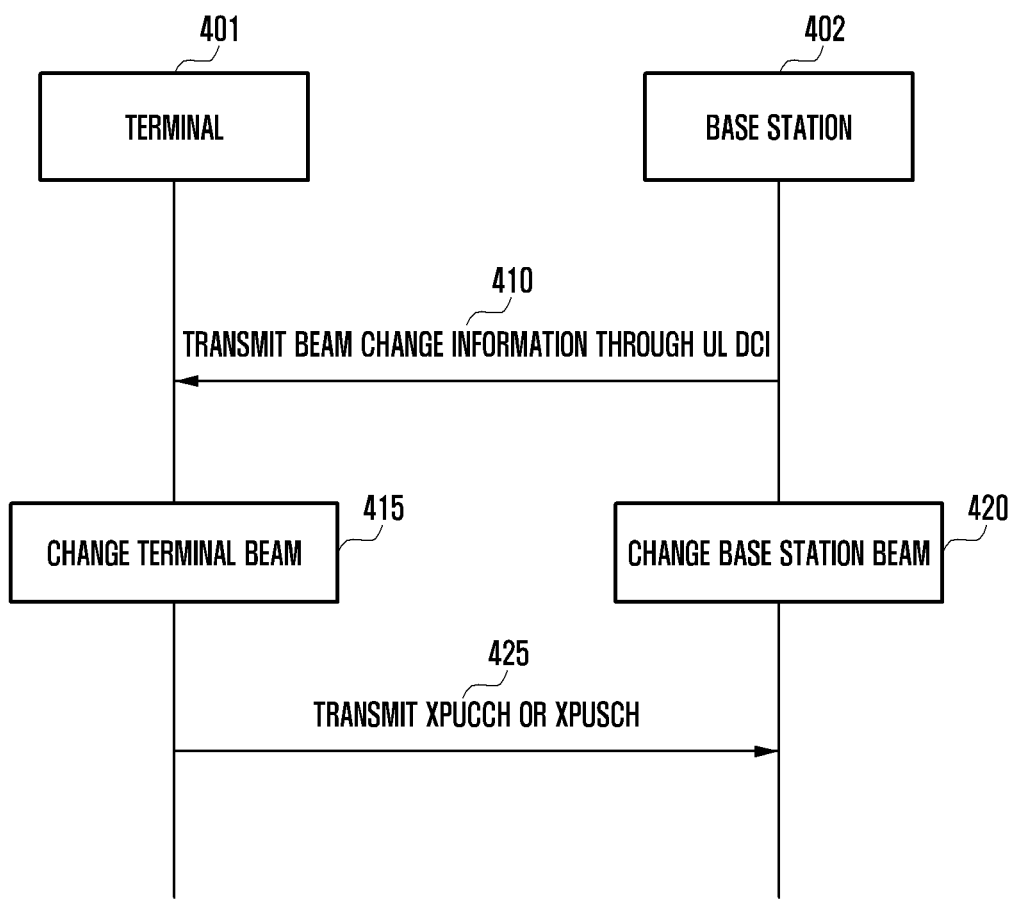
FIG. 4 is a diagram illustrating a beam control method based on uplink (UL) downlink (DL) control information (DCI) according to an embodiment of the present disclosure.

FIG. 4 is a diagram illustrating a beam control method based on UL DCI according to an embodiment of the present disclosure.

Referring to FIG. 4, a terminal 401 and a base station 402 may transmit and receive signals.

At operation 410, the base station 402 may transmit a UL DCI including beam change information to the terminal 401. The beam change information may include indication information that indicates a beam to be changed. Specifically, the beam change information includes at least one BI or BRRS-RI. Also, the base station 402 may transmit additional information associated with the changed beam.

At operation 415, the terminal 401 may change a beam for transmission/reception of signals with the base station 402, based on the received information. Specifically, the terminal 401 may perform signal transmission by applying a beam changed at a UL channel transmission time indicated through the UL DCI. Also, at operation 420, the base station 402 may change a beam corresponding to the terminal 401, based on the information transmitted at operation 410. The beam change may be performed at the same time by the base station 402 and the terminal 401, but is not limited to this. For example, the beam change may be performed at timing capable of transmitting and receiving at least one of xPUCCH and xPUSCH transmitted based on the UL DCI.

At operation 425, the terminal 401 may transmit at least one of xPUCCH and xPUSCH by applying the changed beam.

As discussed in this embodiment, the base station 402 may indicate beam information through the UL DCI to the terminal 401, and beam changes of the terminal 401 and the base station 402 may be performed in response to UL channel transmission/reception allocated by the UL DCI. Also, it is possible to transmit and receive signals through a changed beam by changing a transmitting (Tx) beam and a receiving (Rx) beam of the base station 402 and the terminal 401 in response to the transmission of a channel indicated through the DCI.

Figure 5:
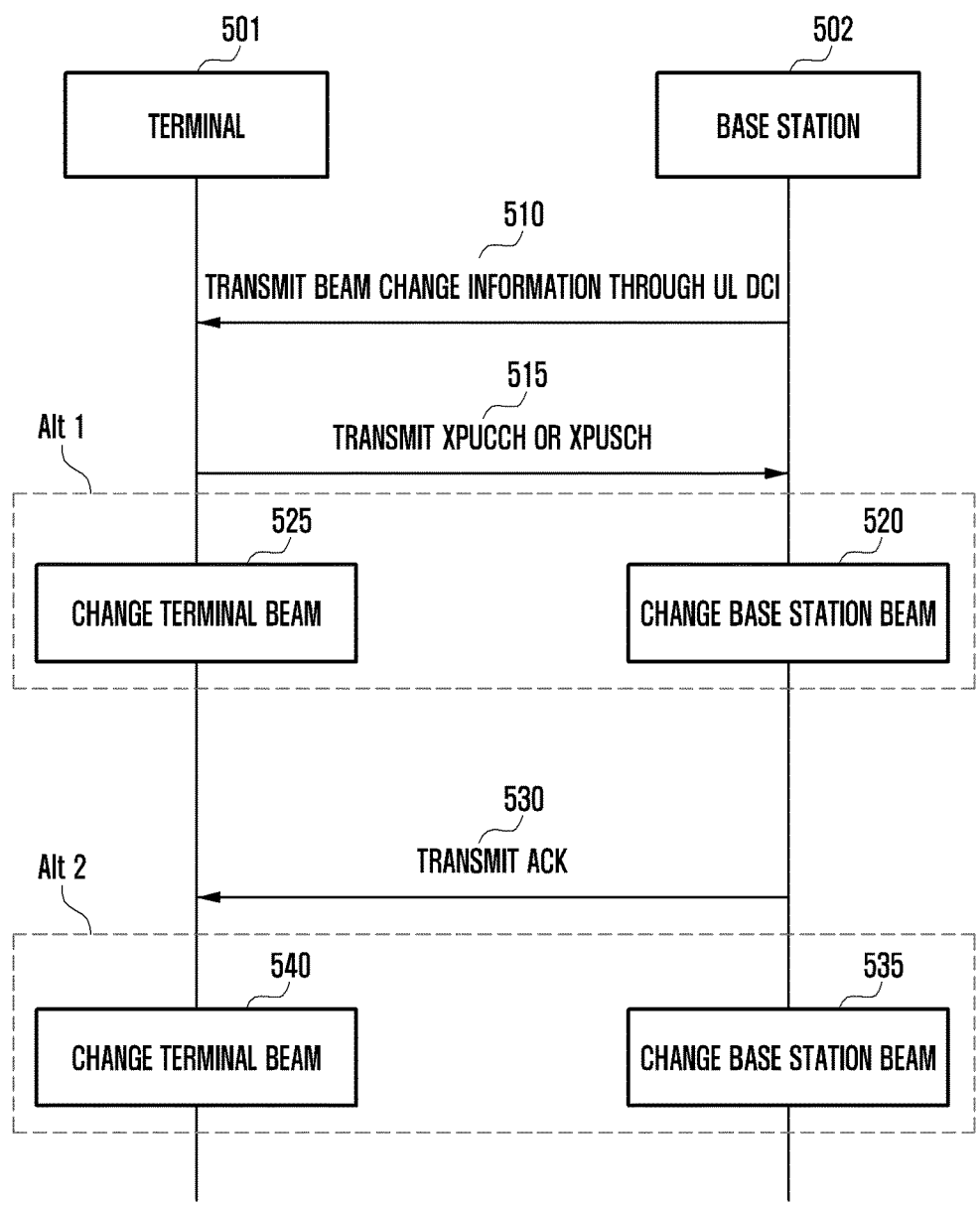
FIG. 5 is a diagram illustrating a beam control method based on UL DCI according to an embodiment of the present disclosure.

FIG. 5 is a diagram illustrating a beam control method based on UL DCI according to an embodiment of the present disclosure.

Referring to FIG. 5, a terminal 501 and a base station 502 may transmit and receive signals.

At operation 510, the base station 502 may transmit a UL DCI including beam change information to the terminal 501. The beam change information may include indication information that indicates a beam to be changed. Specifically, the beam change information includes at least one BI or BRRS-RI. Also, the base station 502 may transmit additional information associated with the changed beam.

At operation 515, the terminal 501 may transmit at least one of xPUCCH and xPUSCH indicated by the UL DCI.

In a first modification of this embodiment, the terminal 501 and the base station 502 may perform beam changes at operations 520 and 525, respectively, based on information included in a message transmitted at operation 510. Thus, at operation 530, the base station 502 may transmit an ACK message to the terminal 501 through the changed beam, and then the terminal 501 may receive the ACK message through the changed beam.

In a second modification of this embodiment, the ACK message may be transmitted from the base station 502 to the terminal 501 at operation 530. Then, at operations 535 and 540, beam changes of the base station 502 and the terminal 501 may be possible in response to at least one of transmission and reception of the ACK message.

As discussed in this embodiment, the base station 502 may indicate beam information through the UL DCI to the terminal 501, and at least one of Tx beam and Rx beam may be changed in response to ACK information transmission for the UL channel.

Figure 6:
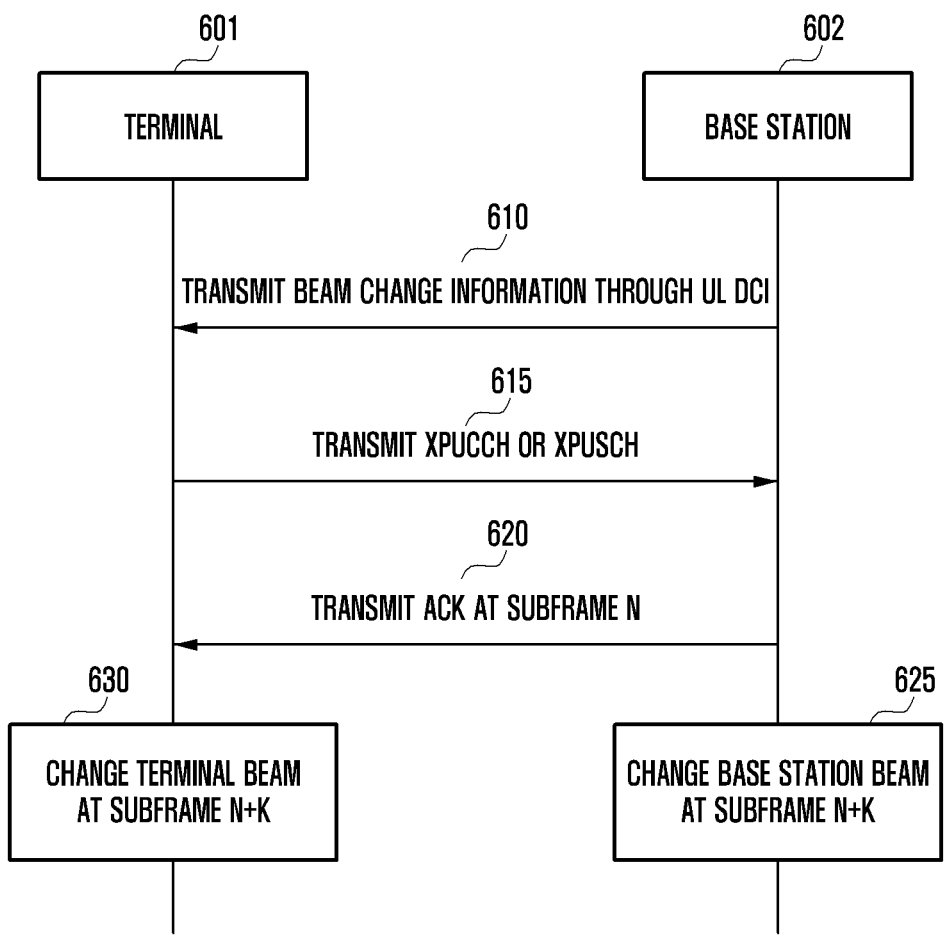
FIG. 6 is a diagram illustrating a beam control method based on UL DCI according to an embodiment of the present disclosure.

FIG. 6 is a diagram illustrating a beam control method based on UL DCI according to an embodiment of the present disclosure.

Referring to FIG. 6, a terminal 601 and a base station 602 may transmit and receive signals.

At operation 610, the base station 602 may transmit a UL DCI including beam change information to the terminal 601. The beam change information may include indication information that indicates a beam to be changed. Specifically, the beam change information includes at least one BI or BRRS-RI. Also, the base station 602 may transmit additional information associated with the changed beam.

At operation 615, the terminal 601 may transmit at least one of xPUCCH and xPUSCH indicated by the UL DCI.

At operation 620, the base station 602 may transmit an ACK corresponding to the at least one of xPUCCH and xPUSCH to the terminal 601 at the subframe n.

At operations 625 and 630, each of the base station 602 and the terminal 601 may change a beam according to the beam change information at the subframe n+k, based on the received ACK. Specifically, the beam change information may be applied to signals transmitted or received after the subframe n+k. In an embodiment, the value of k may be a predetermined value. Also, the value of k may be transmitted from the base station 602 to the terminal 601 through an upper layer signal including at least one of RRC or system information block (SIB), or transmitted by being contained in the UL DCI transmitted at operation 610. Also, in an embodiment, the value of k may be zero. In this case, the base station and the terminal may perform a beam change just after transmission/reception of the ACK.

Figure 7:
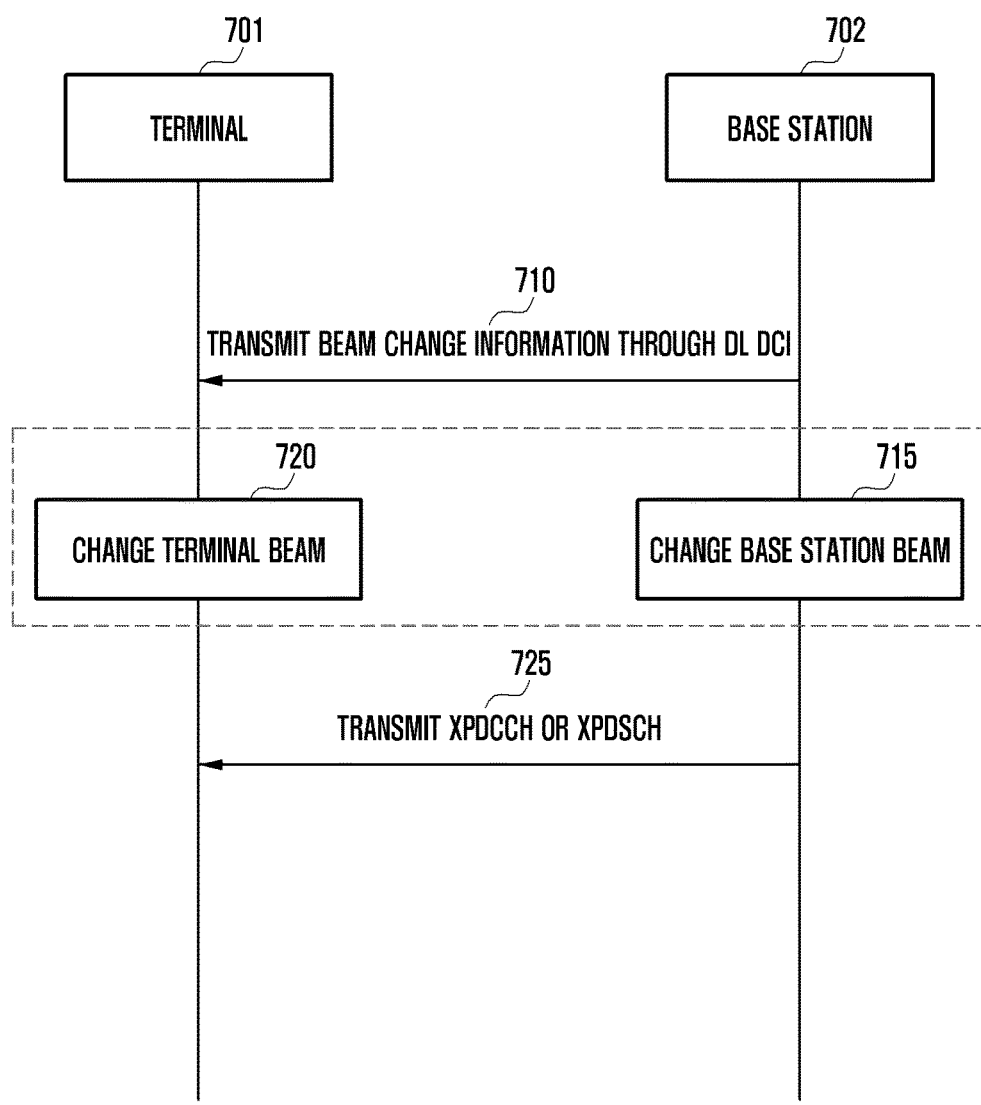
FIG. 7 is a diagram illustrating a beam control method based on DL DCI according to an embodiment of the present disclosure.

FIG. 7 is a diagram illustrating a beam control method based on DL DCI according to an embodiment of the present disclosure.

Referring to FIG. 7, a terminal 701 and a base station 702 may transmit and receive signals.

At operation 710, the base station 702 may transmit a DL DCI including beam change information to the terminal 701. The beam change information may include indication information that indicates a beam to be changed. Specifically, the beam change information includes at least one BI or BRRS-RI. Also, the base station 702 may transmit additional information associated with the changed beam.

At operation 715, the base station 702 may perform a beam change according to the beam change information. Specifically, the base station 702 may change a beam corresponding to the terminal 701 in response to DL channel transmission indicated through the DL DCI. Also, at operation 720, the terminal 701 may change a beam corresponding to the base station 702, based on information indicated in the DL DCI.

At operation 725, the base station 702 may transmit at least one of xPDCCH and xPDSCH to the terminal 701 through the changed beam, and then the terminal 701 may receive the at least one of xPDCCH and xPDSCH through the changed beam.

In an embodiment, the terminal beam change may be simultaneous with the base station beam change, but not limited to this. For example, the terminal beam change may be performed at a suitable timing for receiving signals at operation 725.

Figure 8:
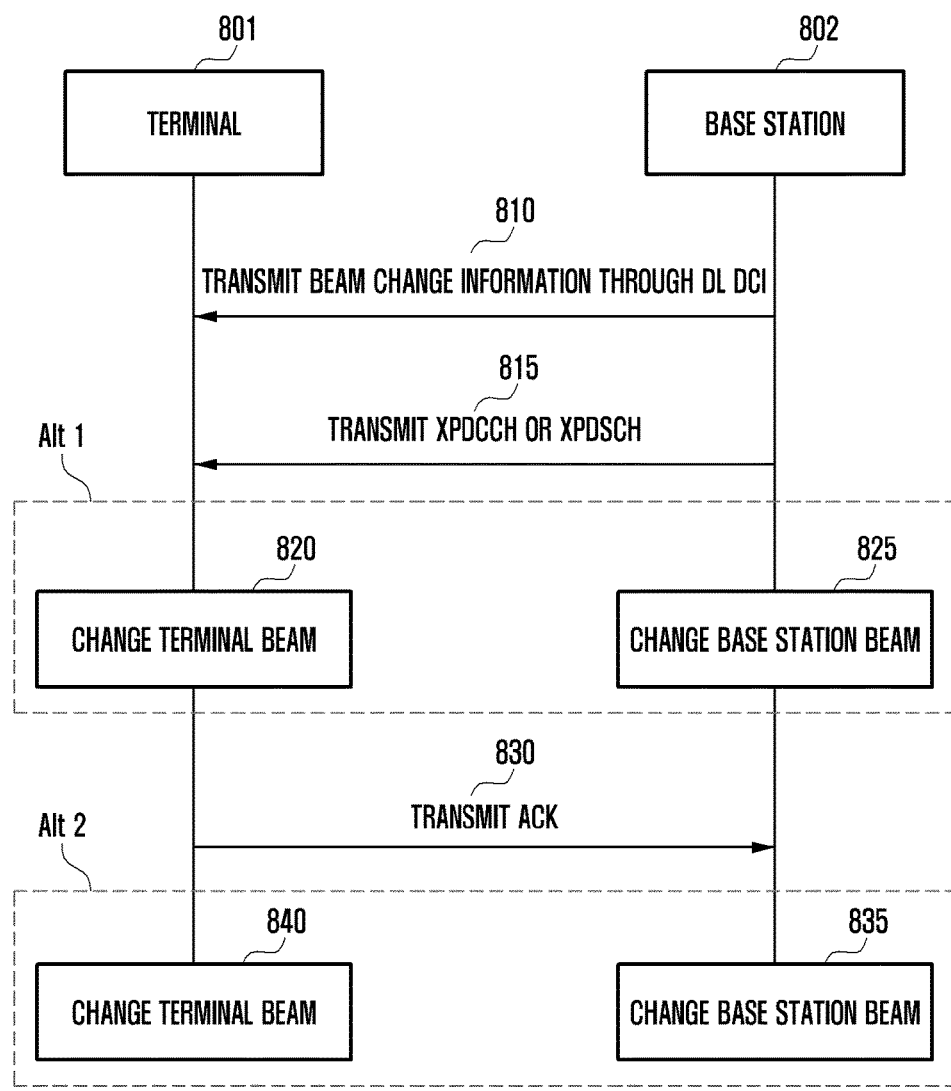
FIG. 8 is a diagram illustrating a beam control method based on DL DCI according to an embodiment of the present disclosure.

FIG. 8 is a diagram illustrating a beam control method based on DL DCI according to an embodiment of the present disclosure.

Referring to FIG. 8, a terminal 801 and a base station 802 may transmit and receive signals.

At 810, the base station 802 may transmit a DL DCI including beam change information to the terminal 801. The beam change information may include indication information that indicates a beam to be changed. Specifically, the beam change information includes at least one BI or BRRS-RI. Also, the base station 802 may transmit additional information associated with the changed beam.

At operation 815, the base station 802 may transmit at least one of xPDCCH and xPDSCH indicated by the DL DCI to the terminal 801.

In a first modification of this embodiment, the terminal 801 may change a beam corresponding to the base station 802 at operation 820, based on the DL DCI. For example, the terminal 801 may change Tx beam and Rx beam corresponding to the base station 802 and, at this time, may change at least one of beams associated with a control channel, a data channel, and a reference signal. At operation 825, the base station 802 may change a beam corresponding to the terminal 801, based on the DL DCI.

At operation 830, the terminal 801 may transmit an ACK for at least one of xPDCCH and xPDSCH indicated by the DL DCI to the base station 802. Specifically, the terminal 801 may send the ACK to the base station 802, based on the beam changed at operation 820. Also, the base station 802 may receive the ACK from the terminal 801, based on the changed beam.

In the second modification of this embodiment, an ACK message may be transmitted from the terminal 801 to the base station 802 at operation 830. Then, at operations 835 and 840, beam changes of the base station 802 and the terminal 801 may be possible in response to at least one of transmission and reception of the ACK message.

In this manner, the time point when the terminal beam and the base station beam are changed may be the same, but are not limited to this embodiment. Beam change timing may be determined to transmit and receive the ACK message of operation 830 through the changed beam.

As discussed above, after transmission of the DL channel, the base station and the terminal may perform the beam change in response to transmission/reception timing of the ACK for informing whether the channel is received or not.

Figure 9:
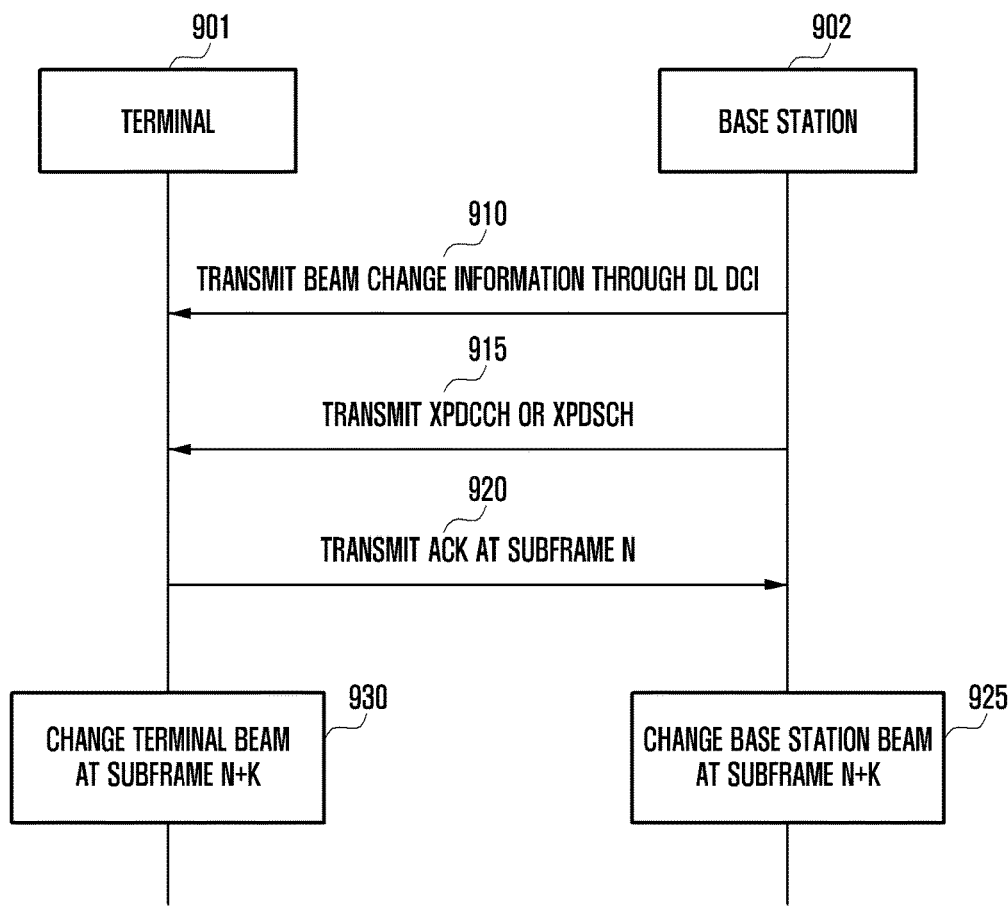
FIG. 9 is a diagram illustrating a beam control method based on UL DCI according to an embodiment of the present disclosure.

FIG. 9 is a diagram illustrating a beam control method based on UL DCI according to an embodiment of the present disclosure.

Referring to FIG. 9, a terminal 901 and a base station 902 may transmit and receive signals.

At operation 910, the base station 902 may transmit a DL DCI including beam change information to the terminal 901. The beam change information may include indication information that indicates a beam to be changed. Specifically, the beam change information includes at least one BI or BRRS-RI. Also, the base station 902 may transmit additional information associated with the changed beam.

At operation 915, the base station 902 may transmit at least one of xPDCCH and xPDSCH indicated by the DL DCI to the terminal 901.

At operation 920, the terminal 901 may transmit an ACK for at least one of xPDCCH and xPDSCH indicated by the DL DCI to the base station 902 at a subframe n.

At operations 925 and 930, the terminal 901 and the base station 902 may change beams corresponding to the base station 902 and the terminal 901, respectively, at the subframe n+k, based on the DL DCI. Specifically, after the subframe n+k, the terminal 901 and the base station 902 may transmit and receive signals, based on the beam indicated by the DL DCI. In an embodiment, the value of k may be a predetermined value. Also, the value of k may be transmitted from the base station 902 to the terminal 901 through an upper layer signal including at least one of RRC and SIB, or transmitted by being contained in the DL DCI transmitted at operation 910. Also, in an embodiment, the value of k may be zero. In this case, the base station and the terminal may perform a beam change just after transmission/reception of the ACK.

As discussed above, the terminal may change the Tx beam or Rx beam corresponding to the base station, based on the UL or DL DCI transmitted by the base station. In addition, the base station may change the Tx beam or Rx beam corresponding to the terminal. Timing for changing the beam indicated by the DCI may be varied depending on the above-discussed embodiments.

In an embodiment, the base station may transmit the DCI including the beam change information to the terminal. The DCI includes at least one BI or BRRS-RI, and may also include indication information for a specific channel or channel group corresponding to BI or BRRS-RI. In response, the base station and the terminal may transmit and receive a designated channel in the DCI field through the corresponding beam. Thus, by indicating a channel, to which a beam to be changed will be applied, to the DCI, it is possible to transmit and receive a signal through a changed beam applied to only a part of the DL channel and the UL channel.

In another embodiment, the base station may instruct the terminal about DL and UL channel beams in the DCI. Based on this, the base station and the terminal may transmit and receive signals by applying the same or different beams to DL and UL channels.

Further, in embodiments, when the beam change information is transmitted through the DL DCI, the beam change information may be applied to only the DL related beam change, and when the beam change information is transmitted through the UL DCI, the beam change information may be applied to only the UL related beam change. However, when there is a UL DCI or DL DCI beam change command, it is not limited to only performing the beam change mapping for the UL channel or DL channel, and the beam change may be variably applied to a specific channel, a specific channel group, or all channel groups.

Also, in embodiments, if control information related to the beam change is received, the changed beam may be continuously applied until the next beam change related control information is received, or the beam change may be temporarily performed.

Specifically, it is possible to perform scheduling for at least one of UL and DL channels through the DCI and transmit the DCI including at least one of BI and BRRS-RI to the terminal. In this case, it is possible to temporarily perform the beam change only for UL and DL signals indicated through the DCI and then return to the original beam. Also, according to embodiments, it is possible to indicate whether the beam change information is temporarily applied or to set the applicable time in the DCI through a separate indication or information. The UL/DL channel indicated through the DCI includes an UL/DL reference signal allocated through the DCI, and this may be also applied to other channels. In the above embodiments as shown in FIGS. 5 and 8, the beam change may be applied not only to the corresponding UL/DL transmission but also to the corresponding ACK transmission/reception time. Also, as shown in FIGS. 6 and 9, the beam change may be temporarily applied in the subframe n+k corresponding to a specific delay, and temporarily applied to a specific channel or channel group in the corresponding subframe n+k. The specific channel or channel group may be predetermined or indicated based on at least one of DCI, MAC-CE, and RRC signaling. Also, when the Tx/Rx beam is corrected through the BRRS in the above embodiments, it is possible to indicate which Tx beam is used for the corresponding BRRS. Namely, the base station may indicate a beam index used for the BRRS transmission through the DCI, and thereby the terminal may receive information about which beam is used for the BRRS and then use that information for setting the Rx beam at BRRS-based correction.

Figure 10:
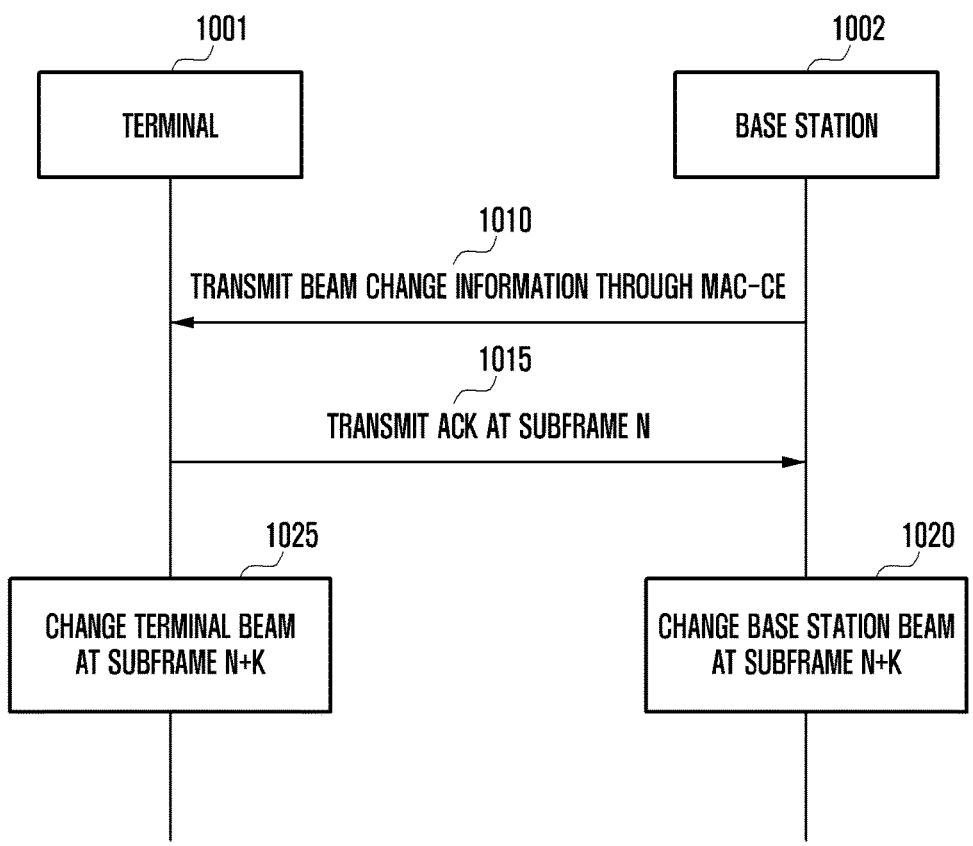
FIG. 10 is a diagram illustrating a beam control method based on a medium access control-control element (MAC-CE) according to an embodiment of the present disclosure.

FIG. 10 is a diagram illustrating a beam control method based on a MAC-CE according to an embodiment of the present disclosure.

Referring to FIG. 10, a terminal 1001 and a base station 1002 may transmit and receive signals.

At operation 1010, the base station 1002 may transmit a MAC-CE including beam change information to the terminal 1001. The beam change information may include indication information that indicates a beam to be changed. Specifically, the beam change information includes at least one BI or BRRS-RI. Also, the base station 1002 may transmit additional information associated with the changed beam.

At operation 1015, the terminal 1001 may transmit an ACK for the MAC-CE to the base station 1002 at the subframe n.

At operations 1020 and 1025, the terminal 1001 and the base station 1002 may change beams corresponding to the base station 1002 and the terminal 1001 at the subframe n+k, respectively, based on information contained in the MAC-CE. Specifically, after the subframe n+k, the terminal 1001 and the base station 1002 may transmit and receive signals, based on beams indicated by information contained in the MAC-CE. In an embodiment, the value of k may be a predetermined value. Also, the value of k may be transmitted from the base station 1002 to the terminal 1001 through an upper layer signal including at least one of RRC and SIB, or transmitted by being contained in the MAC-CE transmitted at operation 1010. Also, in an embodiment, the value of k may be zero. In this case, the base station and the terminal may perform a beam change just after transmission and reception of the ACK.

In an embodiment, when transmitting the beam change information or command with the MAC-CE, the base station may indicate a specific channel or channel group and deliver information about BI or BRRS-RI to be applied to the corresponding group. The base station and the terminal may perform the beam change from the time point when a specific delay is applied to the indicated beam for a channel designated according to the information. It is possible to temporarily transmit and receive the beam change information similarly to case of transmitting the beam control information through the DCI.

Also, in an embodiment, the beam control information may be transmitted to perform a beam change when the beam list information update corresponding to FIGS. 1 and 2 is performed. The base station and the terminal may manage a commonly used beam list, and according to an embodiment, the base station may transmit the beam list related information to the terminal and thereby maintain and update the same beam list between the terminal and the base station. In an embodiment, if N beam lists are managed, the base station may transmit the beam index related information periodically or aperiodically to the terminal. In an embodiment, a beam information change may be performed at the same time when the beam information is updated. In this case, beam update information may be contained in at least one of the DCI, an upper layer signal including an RRC message, and a control message (e.g., MAC-CE), and transmitted to the terminal. Various signaling may be possible.

Hereinafter, embodiments of the beam control method and beam change method will be described. Additionally, a selective beam change and a beam change error processing scheme will be described.

Figure 11:
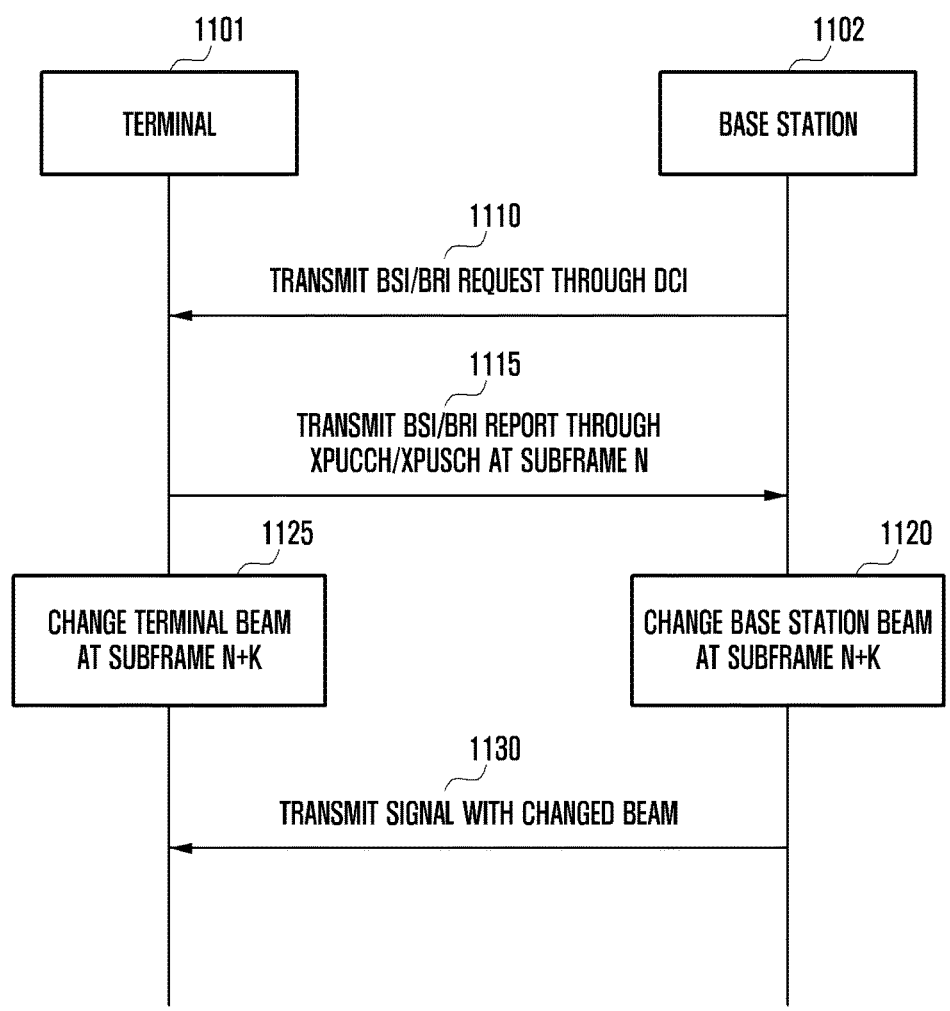
FIG. 11 is a diagram illustrating a beam control method according to an embodiment of the present disclosure.

FIG. 11 is a diagram illustrating a beam control method according to an embodiment of the present disclosure.

Referring to FIG. 11, a terminal 1101 may transmit and receive signals to and from a base station 1102.

At operation 1110, the base station 1102 may transmit information requesting one of BSI and BRI to the terminal 1101. In an embodiment, this information may be transmitted to the terminal 1101 through DCI.

At operation 1115, the terminal 1101 may transmit at least one of BSI and BRI to the base station 1102 through at least one of xPUCCH and xPUSCH at a subframe n. In an embodiment, the at least one of xPUCCH and xPUSCH may be indicated by the DCI. Such beam information reported may include information about at least one beam, and it may be reported sequentially from the best quality beam.

At operation 1120, the base station 1102 may perform a beam change at the subframe n+k, based on the information received at operation 1115. Specifically, the base station 1102 may perform the beam change when at least one of beam BRSRP and BRRS-RP is better, based on the received beam information, in comparison with the currently used beam. Also, at operation 1125, the terminal 1101 may perform the beam change at the subframe n+k, based on the information transmitted at operation 1115. Specifically, the terminal 1101 may perform the beam change when at least one of beam BRSRP and BRRS-RP is better, based on the transmitted beam information, in comparison with the currently used beam. In an embodiment, the beam change may be performed, for example, but not limited to, simultaneously by the base station and the terminal at the corresponding subframe. The beam change may be performed so that signals are transmitted and received through the changed beam at or after the subframe n+k.

At operation 1130, the base station 1102 may transmit a signal to the terminal 1101 through the changed beam.

In an embodiment, the value of k may be a predetermined value or indicated to the terminal 1101 by the base station 1102 according to the following method.

Specifically, the value of k may be indicated to the terminal 1101 in the DCI transmission. At least one bit may be allocated in the DCI for the k-value indication, an example of which is set forth in Table 3. Table 3 shows a method in which the base station indicates the k value to the terminal through 2-bit information.

TABLE 3

| Indication bits | Delay (k) |
| --- | --- |
| 00 | 4 |
| 01 | 5 |
| 10 | 6 |
| 11 | 7 |

Referring to Table 3, a delay value may be determined according to each indication bit. In Table 3, a corresponding relation between the indication bit and the delay values is arbitrarily and may be varied depending on implementation.

Also, in an embodiment, the k value may be indicated through different CRC masks in the DCI transmission. In this case, information may be transmitted by masking CRC, attached to DCI information transmission, with different codes. In an embodiment, such codes may include all distinguishable codes including orthogonal codes. Table 4 shows an example of indicating a delay value through CRC masking.

TABLE 4

| CRC mask | Delay (k) |
| --- | --- |
| 0000000000000000 | 4 |
| 1111111111111111 | 5 |
| 0101010101010101 | 6 |
| 1010101010101010 | 7 |

Referring to Table 4, the k value may be determined on the basis of CRC masking. In an embodiment, a corresponding relation between CRC masking and k value may be applied differently.

Also, in an embodiment, the k value may be indicated through different scrambling sequences in the DCI transmission. In this case, the k value may be indicated by applying different scrambling sequences to the DCI in the DCI transmission.

TABLE 5

| Scrambling seq. | Delay (k) |
| --- | --- |
| a(i), i=0,....,# of data symbol | 4 |
| b(i), i=0,....,# of data symbol | 5 |
| c(i), i=0,....,# of data symbol | 6 |
| d(i), i=0,....,# of data symbol | 7 |

Referring to Table 5, the k value may be indicated on the basis of scrambling sequence applied to the DCI. The above corresponding relation between the scrambling sequence and the k value is exemplary and may be varied depending on implementation.

In addition, the k value may be semi-statically indicated through an upper layer signal including the RRC, and a fixed value agreed between the terminal and the base station may be used. In another embodiment, the k value may be determined based on information delivered through the RRC or the DCI. For example, the k value may be determined based on a value delivered through asynchronous HARQ timing.

Also, the k value may be indicated by a combination of at least two of the above-described methods. For example, RRC signaling may indicate candidates for certain k values, and it is possible to indicate whether to apply any k values of the candidate values through bits, CRC masking, or scrambling sequences in the DCI.

In addition, the k value may be applied as k1+k2, and the base station may inform notify k1 and k2 to the terminal, based on at least one of the above-described methods for indicating k. For example, k1 may be applied as a fixed value, and the base station may variably transmit the k2 value to the terminal in consideration of a channel condition.

Further, in an embodiment, the control information for requesting the beam information reporting may include an indicator for indicating a beam change or not, and thus it may be determined whether to perform the beam change based on the indicator.

Figure 12:
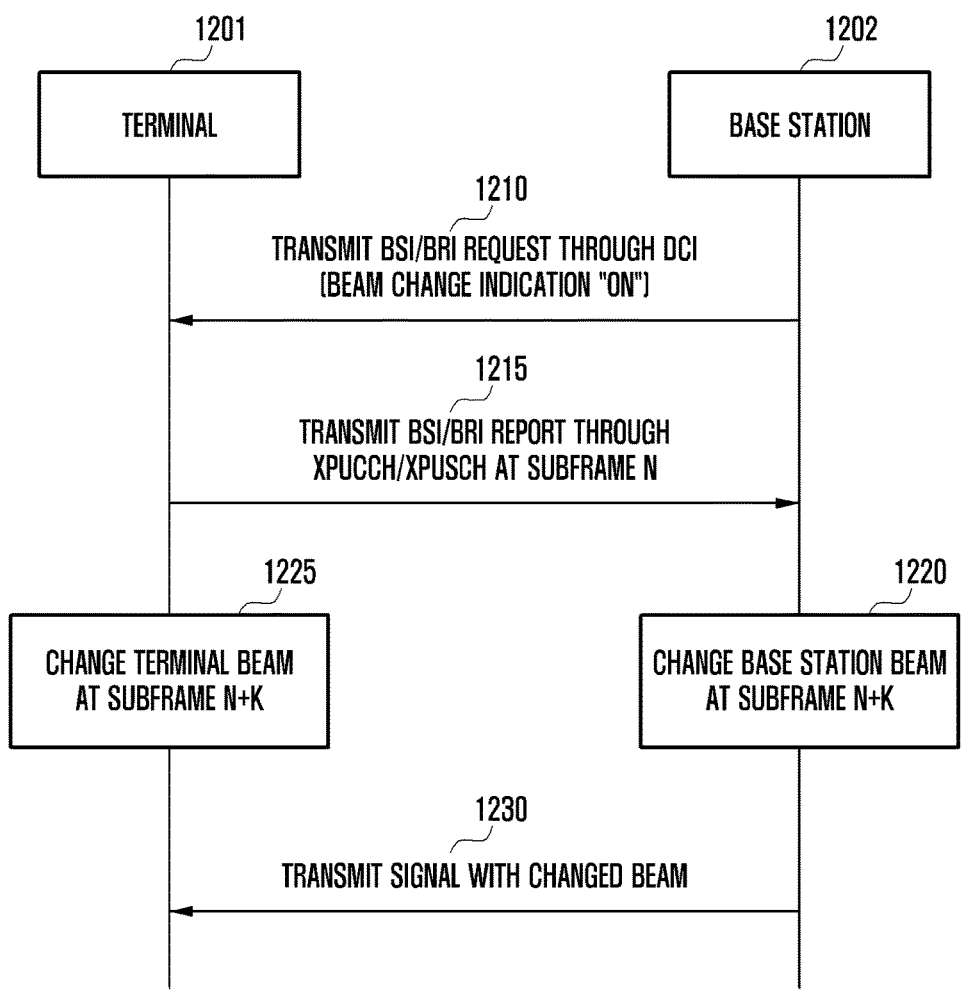
FIG. 12 is a diagram illustrating a beam control method based on a beam control indication contained in DCI according to an embodiment of the present disclosure.

FIG. 12 is a diagram illustrating a beam control method based on a beam control indication contained in DCI according to an embodiment of the present disclosure.

Referring to FIG. 12, a terminal 1201 may transmit and receive signals to and from a base station 1202.

At operation 1210, the base station 1202 may transmit information for requesting one of BSI and BRI to the terminal 1201, and this information may be transmitted to the terminal 1201 through the DCI. In an embodiment, the beam control indication (e.g., beam change indication) may be contained in the DCI. In a process shown in FIG. 12, whether to request the beam change is represented as "on." A detailed method for the beam change indication will be described later.

At operation 1215, the terminal 1201 may transmit at least one of BSI and BRI to the base station 1202 through at least one of xPUCCH and xPUSCH at the subframe n. In an embodiment, the at least one of xPUCCH and xPUSCH may be indicated by the DCI. Such beam information reported may include information about at least one beam, and it may be reported sequentially from the best quality beam.

At operation 1220, the base station 1202 may perform a beam change at the subframe n+k, based on the information received at operation 1215, since the beam change indication is "on" in the DCI transmitted at operation 1210. In another embodiment, the base station may perform the beam change only when at least one of BRSRP and BRRS-RP of the corresponding beam is better than a threshold value for controlling the beam change in comparison with a currently used beam, based on the received beam information. In an embodiment, the k value may be determined using the above-described methods. The threshold value for controlling the beam change will be described later. At operation 1225, the terminal 1201 may perform the beam change at the subframe n+k, based on the information transmitted at operation 1210. The beam change of the terminal 1201 may be also determined based on the threshold value. In an embodiment, the beam change may be performed, for example, but not limited to, simultaneously by the base station and the terminal at the corresponding subframe. The beam change may be performed so that signals are transmitted and received through the changed beam at or after the subframe n+k.

At operation 1230, the base station 1202 may transmit a signal to the terminal 1201 through the changed beam.

Also, at operation 1230, the terminal 1201 may receive the signal through the changed beam, and specifically, may receive the signal through the beam reported at operation 1215 at or after the subframe n+k.

Figure 13:
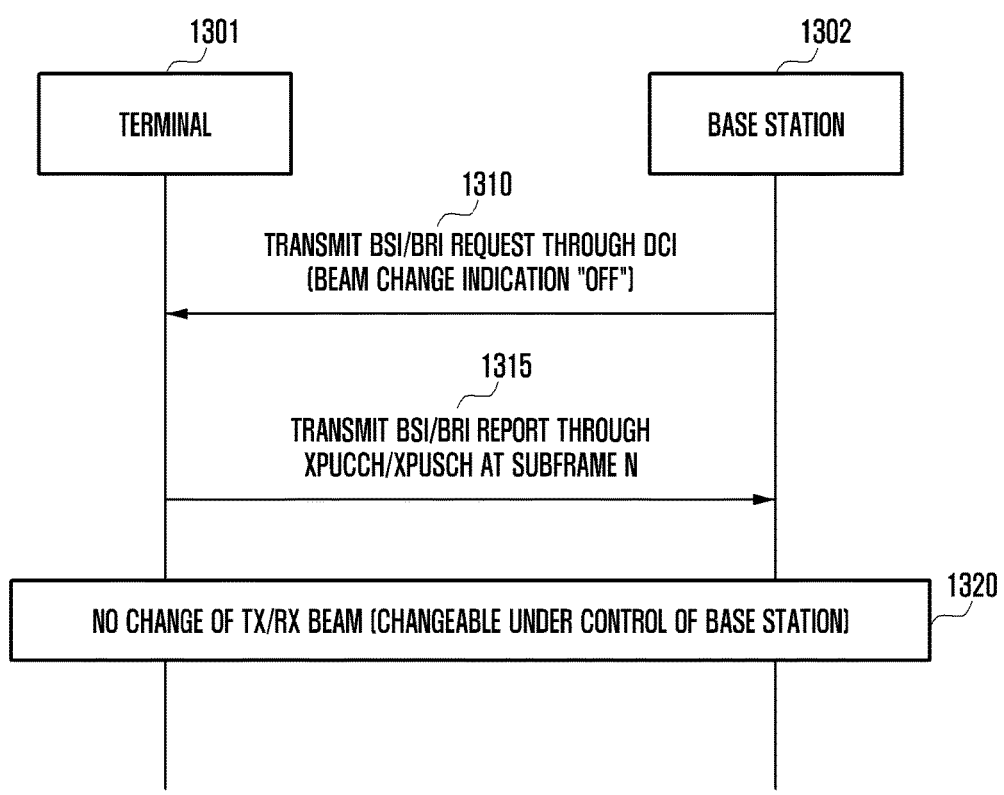
FIG. 13 is a diagram illustrating a beam control method based on a beam control indication contained in DCI according to an embodiment of the present disclosure.

FIG. 13 is a diagram illustrating a beam control method based on a beam control indication (e.g., beam change indication) contained in DCI according to an embodiment of the present disclosure.

Referring to FIG. 13, a terminal 1301 may transmit and receive signals to and from a base station 1302.

At operation 1310, the base station 1302 may transmit information for requesting one of BSI and BRI to the terminal 1301, and this information may be transmitted to the terminal 1301 through the DCI. In an embodiment, information indicating whether to request a beam change may be contained in the DCI. In an embodiment, whether to request the beam change is represented as "off" A detailed method for the beam change indication will be described later.

At operation 1315, the terminal 1301 may transmit at least one of BSI and BRI to the base station 1302 through at least one of xPUCCH and xPUSCH at the subframe n. In an embodiment, the at least one of xPUCCH and xPUSCH may be indicated by the DCI. Such beam information reported may include information about at least one beam, and it may be reported sequentially from the best quality beam.

Since the beam change indication is represented as "off" at operation 1310, the terminal 1301 and the base station 1302 may not change at least one of Tx beam and Rx beam at operation 1320. Namely, the base station 1302 may enable the terminal 1301 to report beam related information and may not perform the beam change. In some embodiments, any additional beam change procedure may be performed under the control of the base station.

Hereinafter, an example of the beam change indication will be described.

According to an embodiment, whether to change a beam may be indicated through the DCI to control the beam change. Specifically, a specific bit may be contained in the DCI to indicate whether to change a beam. For example, if the indication bit is denoted by 0 in the DCI transmission, the beam change may not be performed, and if denoted by 1, the beam change may be performed. Even in case the indication bit is denoted by 1, the beam change may not be performed if the reported beam is identical with the current beam.

Additionally, whether to change a beam may be indicated based on CRC masking and scrambling sequence.

TABLE 6

| CRC mask | Beam change indication |
| --- | --- |
| 0000000000000000 | OFF |
| 1111111111111111 | ON |

Referring to Table 6, whether to change a beam may be indicated through different CRC masks in the DCI transmission. For example, if the CRC of the DCI is formed of 16 bits, the CRC masking with 0000000000000000 may denote that the beam change indication is "off". The CRC masking with 1111111111111111 may denote that the beam change indication is "on". This is exemplary only and any other corresponding relation may be also applied.

TABLE 7

| Scrambling seq. | Beam change indication |
| --- | --- |
| a(i), i=0,....,# of data symbol | OFF |
| b(i), i=0,....,# of data symbol | ON |

Referring to Table 7, whether to change a beam may be indicated by applying different scrambling sequences in the DCI transmission. For example, different kinds of scrambling sequences as shown in Table 7 may indicate that the beam change indication is on or off.

Also, in an embodiment, the beam change according to the BSI/BRI request may be semi-statically indicated through an upper layer signal such as RRC signaling.

Also, in an embodiment, information for indicating whether to change a beam may be contained when reporting at least one of BSI and BRI.

Figure 14:
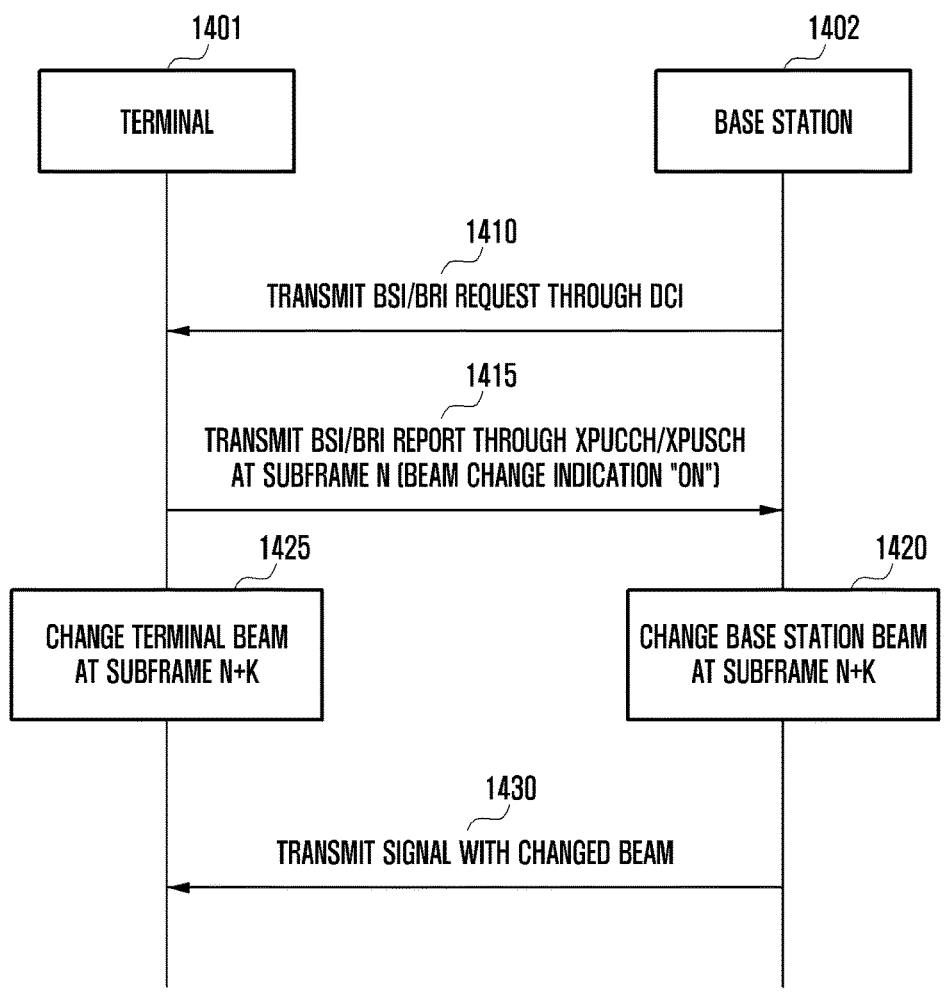
FIG. 14 is a diagram illustrating a beam control method based on a beam control indication contained in a beam information report message according to an embodiment of the present disclosure.

FIG. 14 is a diagram illustrating a beam control method based on a beam control indication contained in a beam information report message according to an embodiment of the present disclosure.

Referring to FIG. 14, a terminal 1401 may transmit and receive signals to and from a base station 1402.

At operation 1410, the base station 1402 may transmit information for requesting one of BSI and BRI to the terminal 1401, and this information may be transmitted to the terminal 1401 through the DCI.

At operation 1415, the terminal 1401 may transmit at least one of BSI and BRI to the base station 1402 through at least one of xPUCCH and xPUSCH at the subframe n. In an embodiment, the at least one of xPUCCH and xPUSCH may be indicated by the DCI. Such beam information reported may include information about at least one beam, and it may be reported sequentially from the best quality beam. In addition to the at least one of BSI and BRI, an indication for indicating whether to change a beam may be transmitted to the base station 1402. In an embodiment, the beam change indication may be on as discussed above. Specifically, to indicate the beam change, a bit for directly indicating the beam change may be contained in a channel transmitted with UL, CRC masking may be applied differently, or scrambling codes may be applied differently.

At operation 1420, the base station 1402 may perform a beam change at the subframe n+k, based on the information received at operation 1415, since the beam change indication is "on" in the information received at operation 1415. In another embodiment, the base station may perform the beam change only when at least one of BRSRP and BRRS-RP of the corresponding beam is better than a threshold value for controlling the beam change in comparison with a currently used beam, based on the received beam information. The k value may be determined using the above-described methods. The threshold value for controlling the beam change will be described later. At operation 1425, the terminal 1401 may perform the beam change at the subframe n+k, based on the information transmitted at operation 1410. The beam change of the terminal 1401 may be also determined based on the threshold value. In an embodiment, the beam change may be performed, for example, but not limited to, simultaneously by the base station and the terminal at the corresponding subframe. The beam change may be performed so that signals are transmitted and received through the changed beam at or after the subframe n+k.

At operation 1430, the base station 1402 may transmit a signal to the terminal 1401 through the changed beam.

Also, at operation 1430, the terminal 1401 may receive the signal through the changed beam, and specifically, may receive the signal through the beam reported at operation 1415 at or after the subframe n+k.

Figure 15:
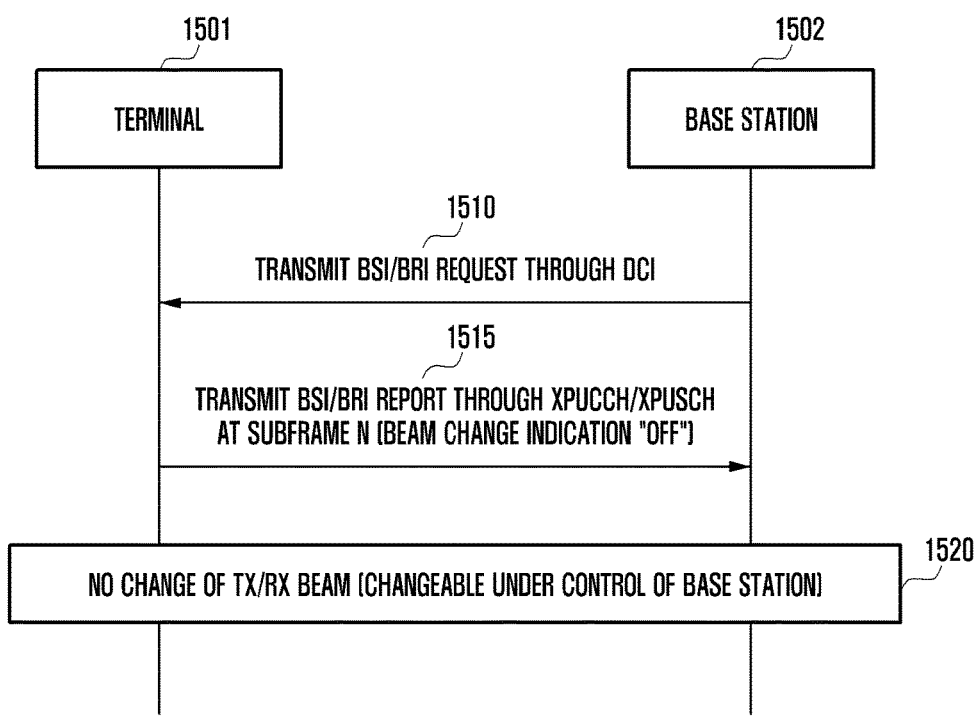
FIG. 15 is a diagram illustrating a beam control method based on a beam control indication contained in a beam information report message according to an embodiment of the present disclosure.

FIG. 15 is a diagram illustrating a beam control method based on a beam control indication contained in a beam information report message according to an embodiment of the present disclosure.

Referring to FIG. 15, a terminal 1501 may transmit and receive signals to and from a base station 1502.

At operation 1510, the base station 1502 may transmit information for requesting one of BSI and BRI to the terminal 1501, and this information may be transmitted to the terminal 1501 through the DCI.

At operation 1515, the terminal 1501 may transmit at least one of BSI and BRI to the base station 1502 through at least one of xPUCCH and xPUSCH at the subframe n. In an embodiment, the at least one of xPUCCH and xPUSCH may be indicated by the DCI. Such beam information reported may include information about at least one beam, and it may be reported sequentially from the best quality beam. To indicate a beam change, the beam change indication may be "off."

Since the beam change indication is represented as "off" at operation 1515, the terminal 1501 and the base station 1502 may not change at least one of Tx beam and Rx beam at operation 1520. However, in some embodiments, any additional beam change procedure may be performed under the control of the base station.

As discussed above, the base station 1502 may enable the terminal 1501 to report beam related information and, based on determination of the terminal 1501, may not perform the beam change.

Also, in an embodiment, the terminal may transmit the beam change indication to the base station and, in response to an ACK signal of the base station, may perform the beam change.

Figure 16:
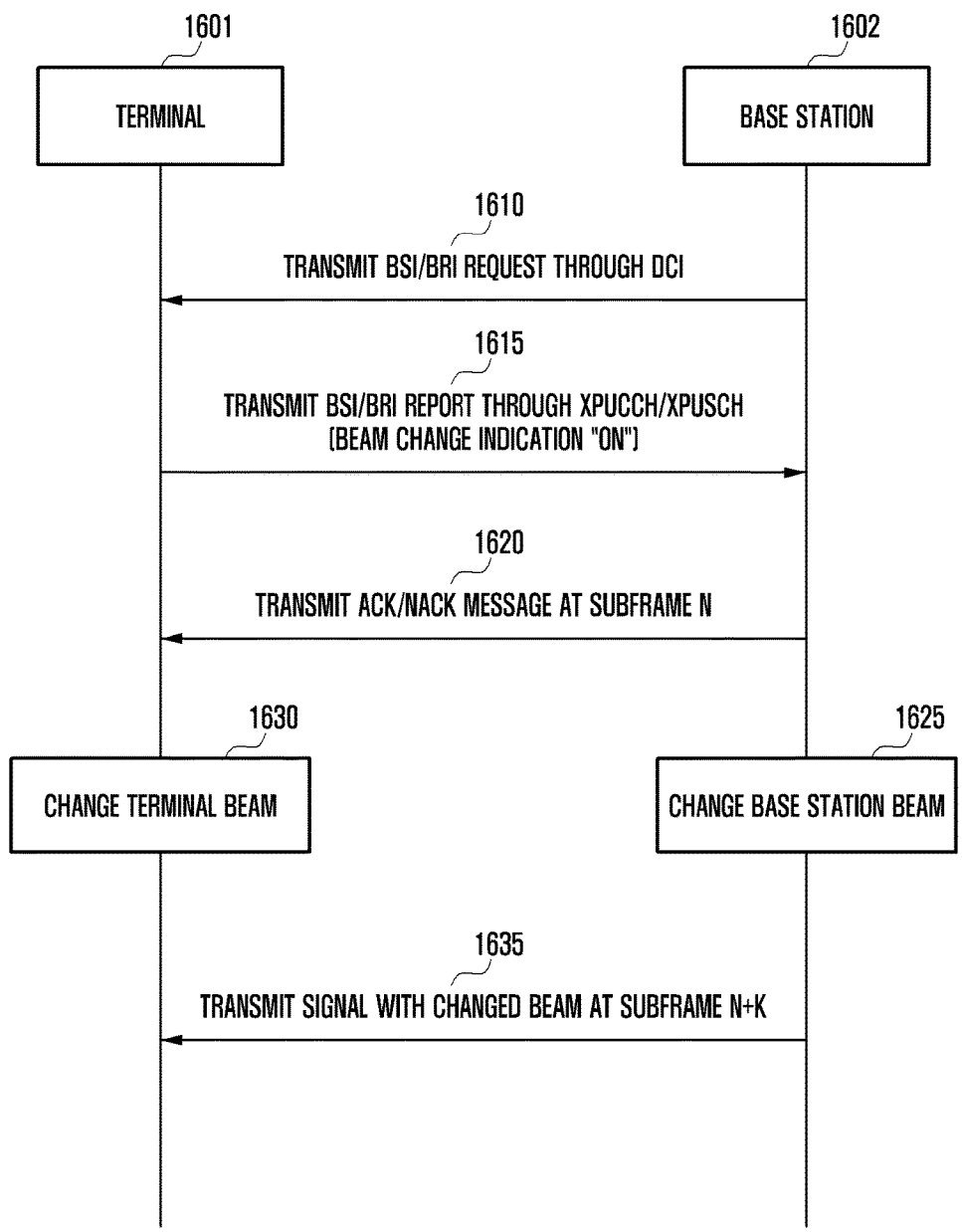
FIG. 16 is a diagram illustrating a beam control method through an acknowledgment (ACK) or non-acknowledgment (NACK) message based on a beam control indication contained in a beam information report message according to an embodiment of the present disclosure.

FIG. 16 is a diagram illustrating a beam control method through an ACK or NACK message based on a beam control indication contained in a beam information report message according to an embodiment of the present disclosure.

Referring to FIG. 16, a terminal 1601 may transmit and receive signals to and from a base station 1602.

At operation 1610, the base station 1602 may transmit information for requesting one of BSI and BRI to the terminal 1601, and this information may be transmitted to the terminal 1601 through the DCI.

At operation 1615, the terminal 1601 may transmit at least one of BSI and BRI to the base station 1602 through at least one of xPUCCH and xPUSCH at the subframe n. In an embodiment, the at least one of xPUCCH and xPUSCH may be indicated by the DCI. Such beam information reported may include information about at least one beam, and it may be reported sequentially from the best quality beam. In addition to the at least one of BSI and BRI, an indication for indicating whether to change a beam may be transmitted to the base station 1602. To indicate a beam change, the beam change indication may be "on."

At operation 1620, the base station 1602 may transmit a signal including a response to the beam change indication to the terminal 1601 at the subframe n. In an embodiment, if no response or a negative response (NACK) is transmitted from the base station 1602, the beam change may not be performed. Namely, the base station 1602 that receives a request for a beam change from the terminal 1601 may send a NACK message not to perform the beam change.

If a positive response (ACK) is transmitted from the base station at the subframe n, the base station 1602 may change the base station beam at operation 1625, based on the information received at operation 1615. Specifically, the signal transmission with the changed beam may be possible from the subframe transmitted when a given time (e.g., k subframes) elapses after the transmission of the positive response. Also, at operation 1630, the terminal 1601 may perform the beam change at the subframe n+k, based on the information transmitted at operation 1615. In an embodiment, the beam change may be performed, for example, but not limited to, simultaneously by the base station and the terminal at the corresponding subframe. The beam change may be performed so that signals are transmitted and received through the changed beam at or after the subframe n+k.

At operation 1635, the base station 1602 may transmit a signal to the terminal 1601 through the changed beam. The value of k may be determined using the above described methods.

Figure 17:
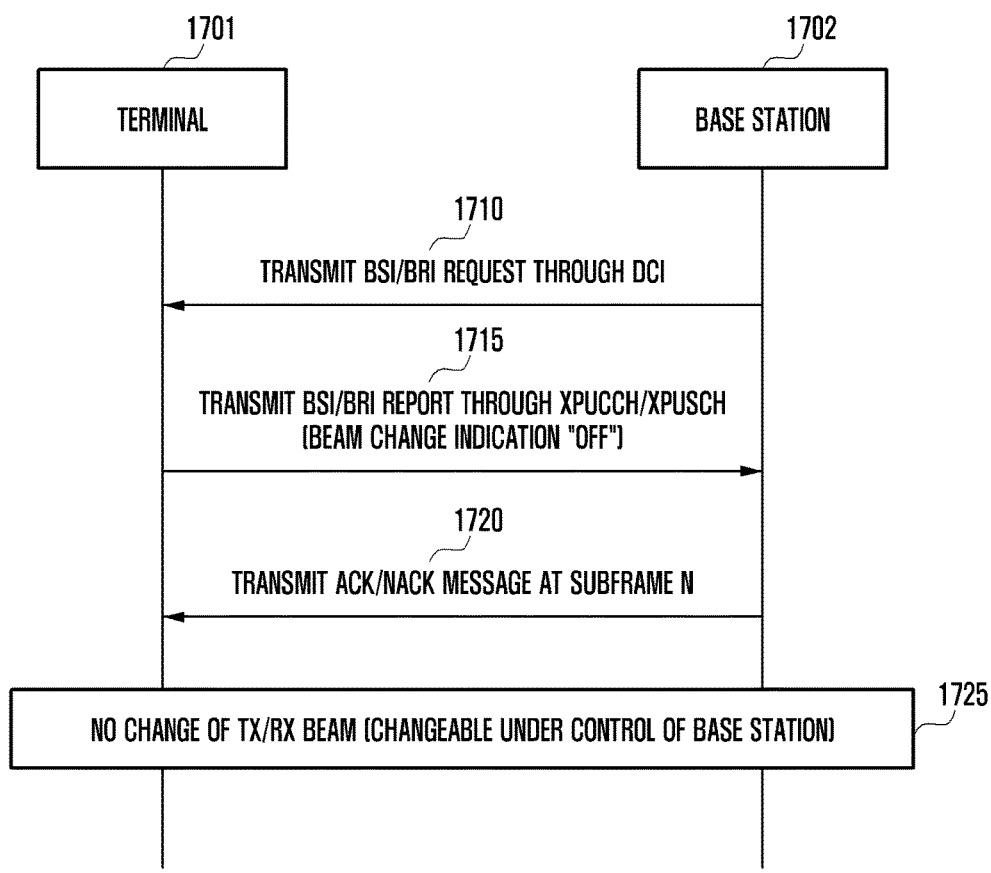
FIG. 17 is a diagram illustrating a beam control method through an ACK or NACK message based on a beam control indication contained in a beam information report message according to an embodiment of the present disclosure.

FIG. 17 is a diagram illustrating a beam control method through an ACK or NACK message based on a beam control indication contained in a beam information report message according to an embodiment of the present disclosure.

Referring to FIG. 17, a terminal 1701 may transmit and receive signals to and from a base station 1702.

At operation 1710, the base station 1702 may transmit information for requesting one of BSI and BRI to the terminal 1701, and this information may be transmitted to the terminal 1701 through the DCI.

At operation 1715, the terminal 1701 may transmit at least one of BSI and BRI to the base station 1702 through at least one of xPUCCH and xPUSCH at the subframe n. In an embodiment, the at least one of xPUCCH and xPUSCH may be indicated by the DCI. Such beam information reported may include information about at least one beam, and it may be reported sequentially from the best quality beam. In addition to the at least one of BSI and BRI, an indication for indicating whether to change a beam may be transmitted to the base station 1702. To indicate a beam change, the beam change indication may be "off."

At operation 1720, the base station 1702 may transmit a signal including a response to the beam change indication to the terminal 1701 at the subframe n. In an embodiment, if no response is transmitted from the base station 1702, the beam change may not be performed. Also, the base station 1702 may transmit a negative response (NACK) so that the beam change is performed.

If a positive response (ACK) is transmitted at the subframe n, the base station 1702 and the terminal 1701 may not perform the beam change at operation 1725. However, even in this case, the beam change may be performed based on additional information transmitted by the base station at operation 1720.

In the above embodiments shown in FIGS. 12 to 17, the base station may determine the beam change, based on the received BSI/BRI information, and then transmit information for indicating the beam change to the terminal. Such operations may be performed regardless of whether the beam change indication transmitted by the terminal is on or off.

In connection with the above method for indicating the beam change, the following operations of the base station and the terminal are possible.

If there are at least two beam related reference signals, the beam change methods discussed above with reference to FIGS. 12 to 17 may be performed only for a beam corresponding to a specific reference signal. In an embodiment, the above methods may be applied to a periodic or cell-specific reference signal. In another embodiment, the above methods may not be applied to an aperiodic or terminal-specific reference signal. Depending on embodiments, such reference signals to which the above methods are applied or not may be varied.

In addition to the above-discussed beam change methods, any other beam change method may be used at the same time in the system. Uncertainty in the beam change may occur when different beam change methods are mixed, and in such a case, the uncertainty may be eliminated by utilizing the OFF mode in controlling the base station beam or the terminal beam.

Also, when the base station control and the terminal control operate together, it may be considered to transmit the indication information about the beam change as "off" according to an environment suitable for the base station control or the terminal control. Specifically, when the base station control and the terminal control are mixed with respect to the beam change, the uncertainty in the beam change may be eliminated through priority. The following describes related embodiments.

The base station control takes precedence, and when the beam change is "off" in the terminal control, the terminal control may take precedence over the base station control.

The base station control takes precedence, and when the beam change is "on" in the terminal control, the terminal control may take precedence over the base station control.

The terminal control takes precedence, and when the beam change is "off" in the base station control, the base station control may take precedence over the terminal control.

The terminal control takes precedence, and when the beam change is "on" in the base station control, the base station control may take precedence over the terminal control.

Also, in an embodiment, if the terminal selects beam information to be reported, based on the best BRSRP/BRRS-RP, and then reports the beam information to the base station, the base station may perform the beam change with a beam corresponding to the optimal BRSRP/BRRS-RP among beams delivered. When the beam is changed with the optimum beam, frequent beam changes may occur even when there is no large gain compared to the beam currently used in the service. In order to control unnecessary beam changes, a threshold value may be applied for determining whether to perform the beam change.

In an embodiment, if the number of beams reported to the base station by the terminal is one, the following procedure is possible.

If a difference in BRSRP/BRRS-RP between a currently used beam by the terminal and the base station and the optimal beam measured by the terminal is greater than a specific threshold, the terminal may report the measured optimal beam. Similarly, if the difference in BRSRP/BRRS-RP between the currently used beam by the terminal and the base station and the optimal beam measured by the terminal is smaller than the specific threshold, the terminal may report the currently used beam. Also, in an embodiment, if the beam change indication is off, the terminal may also report beam information having BRSRP/BRRS-RP smaller than the threshold to the base station. Also, the terminal may always report the measured optimal beam, and the base station may determine, based on the threshold, whether to apply the beam change or not.

When the terminal reports the threshold-based beam information in the above manner, the base station knows how better beam than the current service beam is received. Therefore, the base station may perform the beam change with the corresponding beam and thereby avoid frequent beam changes due to reports of beams smaller than the threshold.

Also, in an embodiment, if the number of beams reported to the base station by the terminal is two or more, the following procedure is possible.

When the terminal reports beam related information to the base station, the base station and the terminal may operate one beam in the same manner as the N=1 case (namely, this means a beam to which the threshold is applied) and also select the best BRSRP/BRRS-RP based beam among the remaining N−1 beams.

If there are two or more beams to which the threshold is applied, the base station and the terminal may select the optimal BRSRP/BRRS-RP reference beam among beams that satisfy the threshold condition, and also select the best BRSRP/BRRS-RP based beam among the remaining N-x beams.

In an embodiment, if the beam satisfying the threshold condition is smaller than x, it may also be possible to select the optimal BRSRP/BRRS-RP based beam.

When the terminal reports the optimal beam related information to the base station in the above manner and the beam change indication is on, the terminal performs the beam change to the optimal beam among beams to which the threshold condition is applied in order to avoid frequent beam changes. In case of the terminal beam, the beam change may be performed to a beam corresponding to the base station beam.

Figure 18:
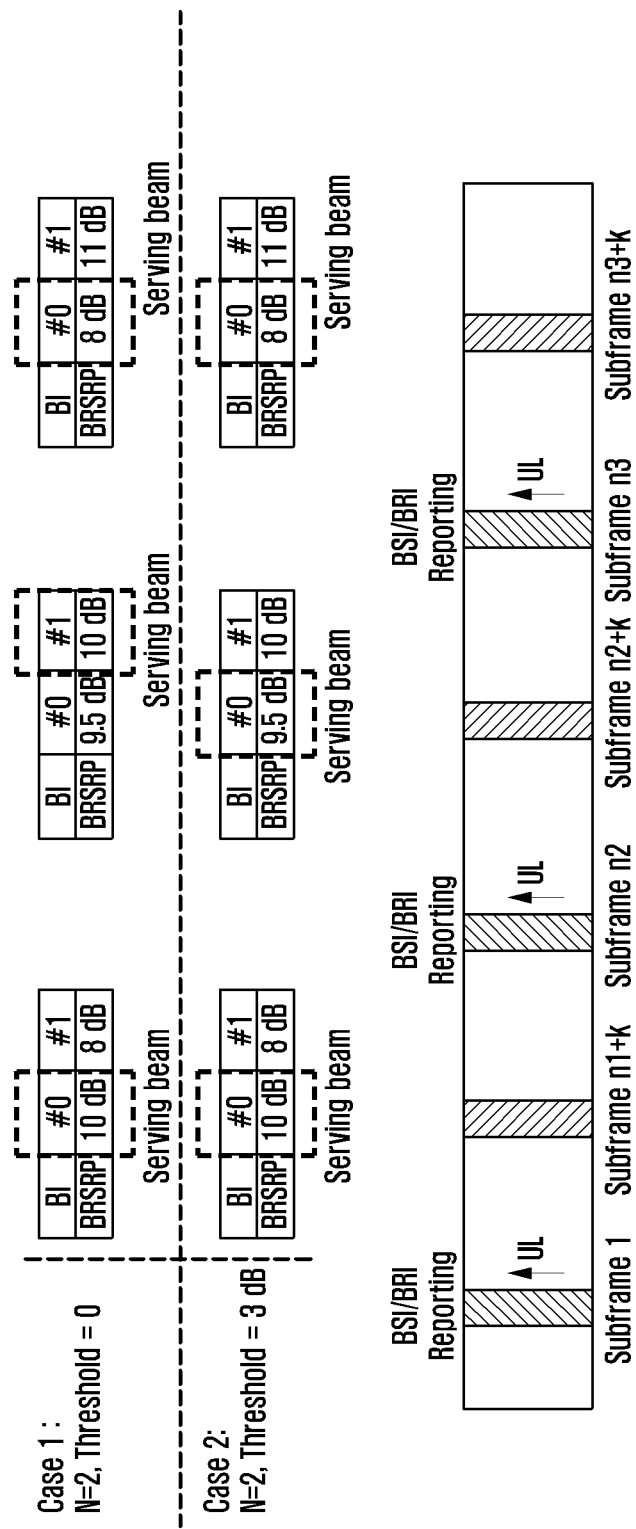
FIG. 18 is a diagram illustrating a beam change method based on a threshold value according to an embodiment of the present disclosure.

FIG. 18 is a diagram illustrating a beam change method based on a threshold value according to an embodiment of the present disclosure.

Referring to FIG. 18, shown is a process in which the terminal selects a beam to be reported to the base station in a reporting environment using a threshold condition. For convenience of explanation, it is assumed that two BRS beams are measured and one beam is selected. Case 1 shows that when the threshold is set to 0, the beam is selected based on the optimum BRSRP. On the other hand, if the threshold value is set to 3 dB, the beam #1 may be selected when the BRSRP is higher by 3 dB than the BRSRP of the beam #0 used in the service.

Figure 19:
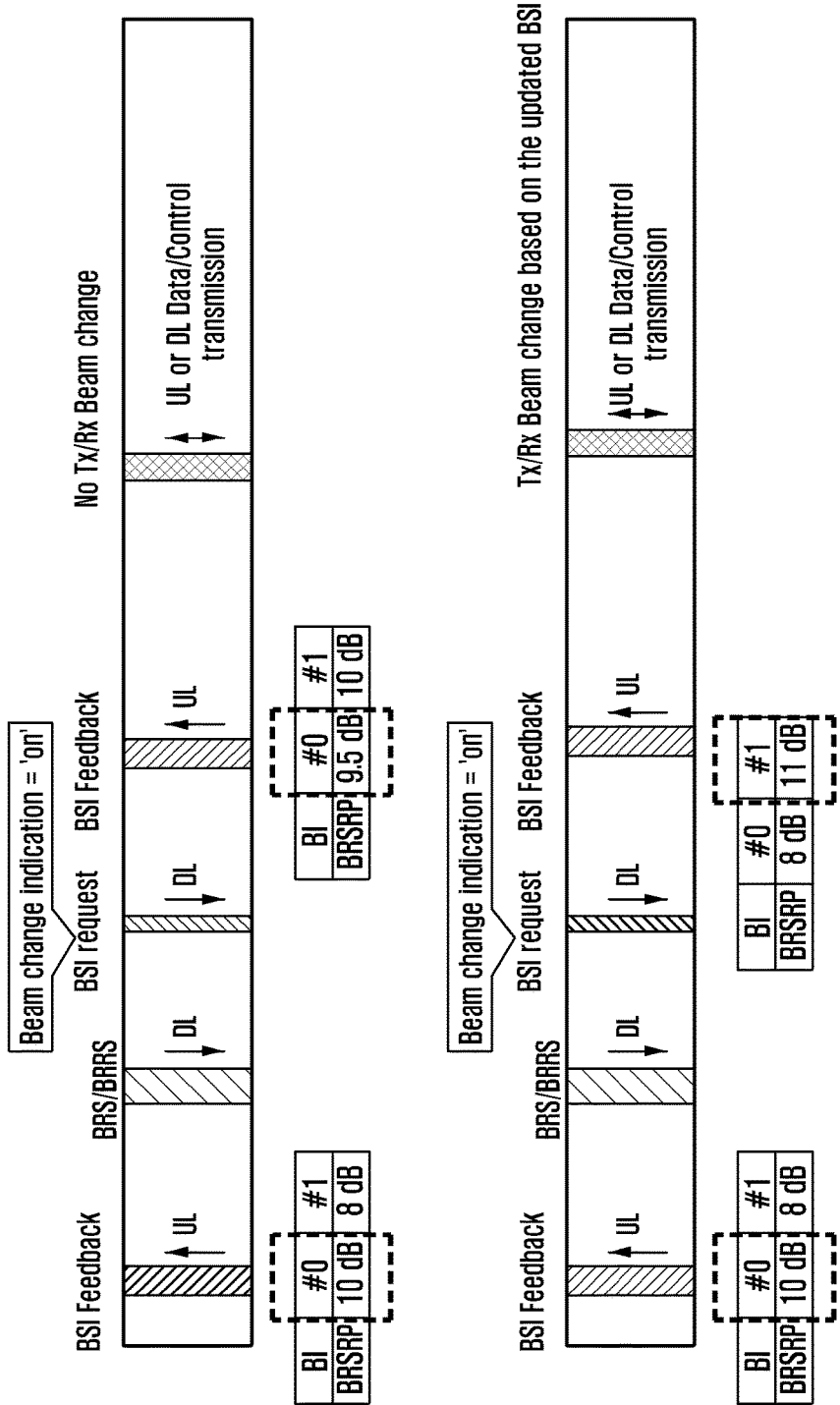
FIG. 19 is a diagram illustrating a beam change method based on a threshold value according to an embodiment of the present disclosure.

FIG. 19 is a diagram illustrating a beam change method based on a threshold value according to an embodiment of the present disclosure.

Referring to FIG. 19, shown is a process in which the terminal selects a beam to be reported to the base station in a reporting environment using a threshold condition.

Although the threshold value may be 3 dB in this embodiment, this may be variable. If the beam change indication is "on," and if the threshold condition is not satisfied after the beam #0 is reported as shown in the first case, the beam #0 is reported even though the beam #1 has a higher BRSRP and no beam change may be performed in the base station. If the beam #1 satisfies the threshold condition as shown in the second case, the beam #1 may be reported and then the base station beam may be changed to the beam #1 from a specific time point. Also, the terminal beam may be changed accordingly.

Figure 20:
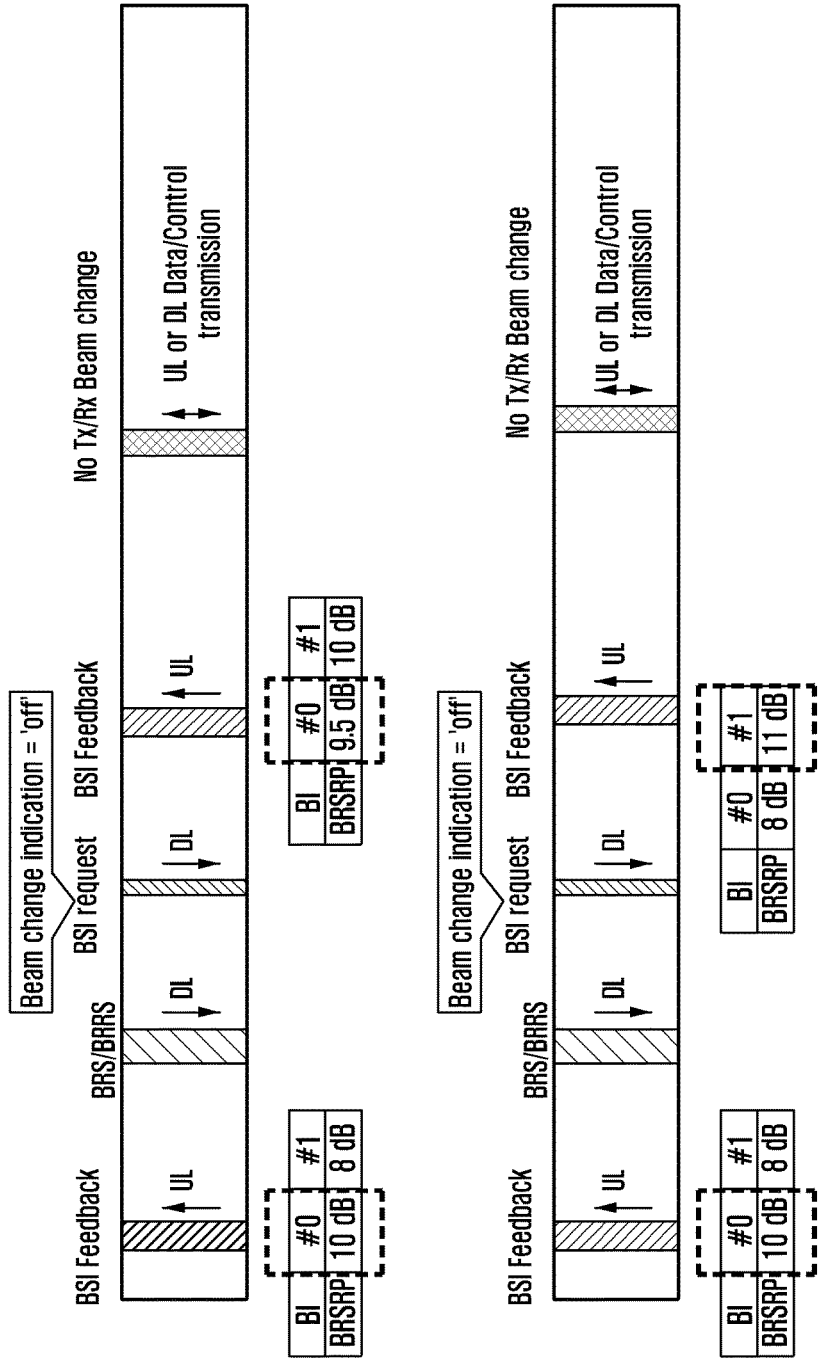
FIG. 20 is a diagram illustrating a beam change method based on a threshold value according to an embodiment of the present disclosure.

FIG. 20 is a diagram illustrating a beam change method based on a threshold value according to an embodiment of the present disclosure.

Referring to FIG. 20, shown is a process in which the terminal selects a beam to be reported to the base station in a reporting environment using a threshold condition. Although the threshold value may be 3 dB in this embodiment, this may be variable. If the beam change indication is "off," no beam change occurs regardless of the reported beam information. In this case, the beam information may be reported by applying the threshold condition. Alternatively, without applying the threshold condition, the optimal beam information measured currently by the terminal may be reported to the base station.

In embodiments, conditions associated with the threshold value may be used as follows.

The base station offers a threshold value to the terminal (i.e., RRC signaling or DCI or MAC-CE).

The terminal determines and transmits information about N beams, based on the optimal BRSRP or BRRS-RP.

If the optimal beam among reported beams satisfies a specific threshold condition, the base station and the terminal perform the beam change automatically at the subframe n+k when a report is made at the subframe n.

Further, in an embodiment, the beam change may be indicated for only some channels. Specifically, different beams may be applied to the UL and the DL, and even in the same UL or DL, different beams may be applied to the data channel and the control channel. In addition, specific channels may be grouped and, based on this, the beam change may be applied.

Examples of such groupings may be applied as follows.

Indication of a beam change to a specific physical (PHY) channel; when a specific channel is indicated, the beam change is applied to only the specific channel.

Indication of a beam change to UL channels, DL channels, or all channels: If UL related all channels, DL related all channels, or UL/DL all channels are designated when indication information for a selective beam change is transmitted, the beam change is applied to only the designated channels.

Indication of a beam change to a specific group of PHY channels: PHY channels are grouped in a certain manner other than UL/DL manner and the beam change is indicated to the corresponding group to change only beams of channels or signals in that group.

Grouping is not limited to the above example, and any other grouping or combination may be applied to the selective beam change. In the selective beam change, the control of the beam change for a specific group is possible under the control of at least one of the base station and the terminal.

In order to transmit information associated with the selective beam change, the following methods may be used.

Indication method based on a specific bit included in BSI/BRI request DCI

Indication method applying different CRC masks to the transmission of BSI/BRI request DCI Indication method applying different scrambling sequences to the transmission of BSI/BRI request DCI Semi-static indication method based on a higher layer signal including RRC Indication method combining all or parts of the above four methods

TABLE 8

| Indication bits | Indicated Channels |
| --- | --- |
| 00 | PUCCH, PUSCH |
| 01 | PDCCH, PDSCH |
| 10 | SRS, PUCCH, PUSCH |
| 11 | CSI-RS, PDCCH, PDSCH |

Table 8 shows an example of the indication method based on a specific bit included in the BSI/BRI request DCI. In case the terminal receives such information, Tx and Rx beams related to PUCCH and PUSCH may be changed based on beam information reported when the indication bit is "00," and Tx and Rx beams related to PDCCH and PDSCH may be changed based on beam information reported when the indication bit is "01."

TABLE 9

| CRC mask | Indicated Channels |
| --- | --- |
| 0000000000000000 | PUCCH, PUSCH |
| 1111111111111111 | PDCCH, PDSCH |
| 0101010101010101 | SRS, PUCCH, PUSCH |
| 1010101010101010 | CSI-RS, PDCCH, PDSCH |

Table 9 shows an example of the indication method applying different CRC masks to the transmission of the BSI/BRI request DCI. Through different CRC masks, channels to be changed may be indicated.

TABLE 10

| Scrambling seq. | Indicated Channels |
| --- | --- |
| a(i), i=0,....,# of data symbol | PUCCH, PUSCH |
| b(i), i=0,....,# of data symbol | PDCCH, PDSCH |
| c(i), i=0,....,# of data symbol | SRS, PUCCH, PUSCH |
| d(i), i=0,....,# of data symbol | CSI-RS, PDCCH, PDSCH |

Table 10 shows an example of the indication method applying different scrambling sequences to the transmission of the BSI/BRI request DCI. By applying different scrambling sequences, channels to be changed may be indicated.

TABLE 11

| Indication bits | Indicated UL Channels | Indicated DL Channels |
| --- | --- | --- |
| 00 | PUCCH | PDCCH |
| 01 | PUSCH | PDSCH |
| 10 | PUCCH, PUSCH | PDCCH, PDSCH |
| 11 | SRS, PUCCH, PUSCH | CSI-RS, PDCCH, PDSCH |

Table 11 shows an example of indicating the beam change to different channels in UL and DL channels, based on the same indication bits.

Specifically, the indication of UL channel beam change may be transmitted to the terminal through the UL DCI, and the indication of DL channel beam change may be transmitted to the terminal through the DL DCI. Also, such indications may be transmitted semi-statically to the terminal through an upper layer signal such as RRC.

A beam change procedure including the methods as shown in Tables 8 to 11 may be performed as follows.

In case channels indicated by the base station control and the terminal control are different, all beams are changed.

Channels allowing the beam change controllable by the base station and channels allowing the beam change controllable by the terminal are separately operated.

For example, the indication for a selective beam change with regard to DL channels may be operated only by the base station control, and the indication for a selective beam change with regard to UL channels may be operated only by the terminal control. Any other separate operation based on a specific group other than DL/UL classification is also possible. An embodiment shown in Table 11 relates to simultaneous operation by the base station control and the terminal control based on the DL/UL classification. In this case, the indication for a selective beam change of the terminal is limited to the UL channel, and the indication for a selective beam change of the base station is limited to the DL channel.

Also, there may be no restriction on channels allowing a beam change controllable by the base station and the terminal, but it is possible to prioritize the control of the base station or the terminal in the beam change control for a specific channel. As an example, the indication of the selective beam change on the UL channel is given priority over the terminal control, and the indication of the selective beam change on the DL channel is given priority over the base station control.

Figure 21:
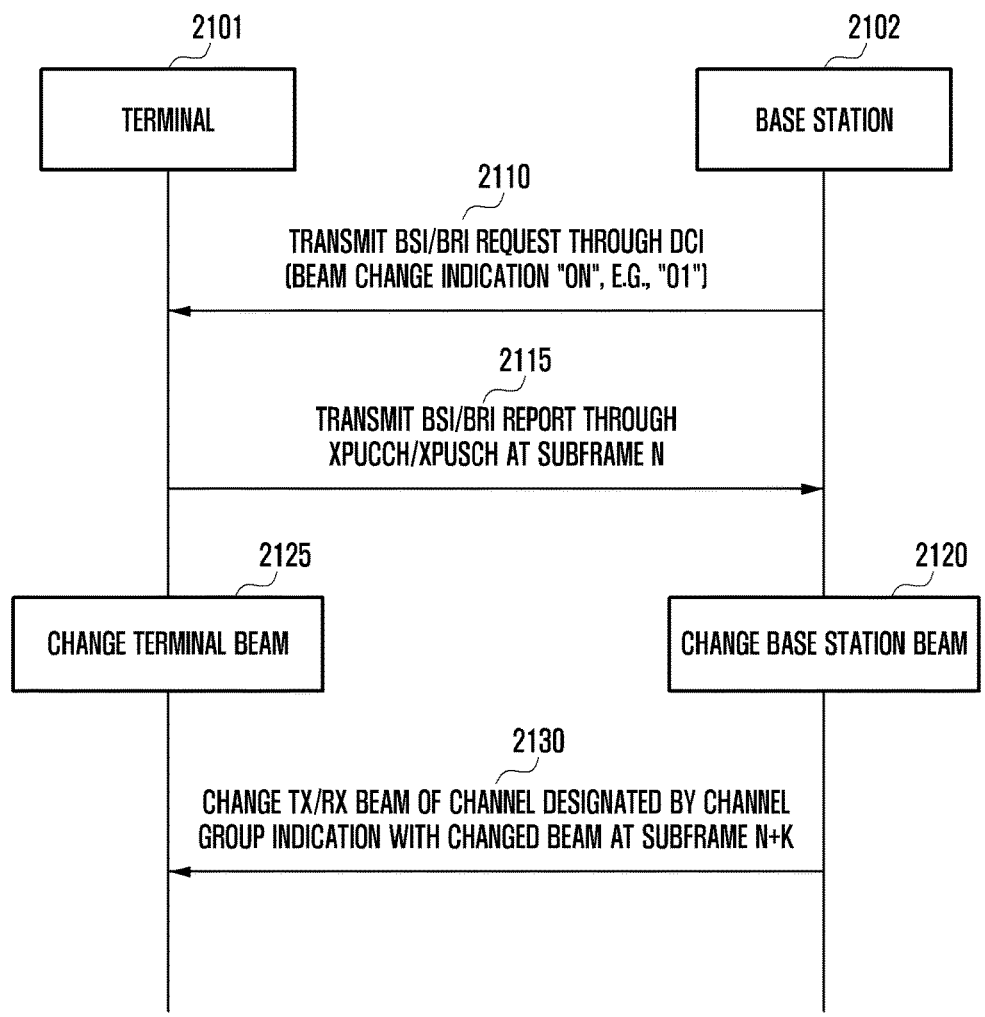
FIG. 21 is a diagram illustrating a selective beam change method according to an embodiment of the present disclosure.

FIG. 21 is a diagram illustrating a selective beam change method according to an embodiment of the present disclosure.

Referring to FIG. 21, a terminal 2101 may transmit and receive signals to and from a base station 2102.

At operation 2110, the base station 2102 may transmit information for requesting one of BSI and BRI to the terminal 2101, and this information may be transmitted to the terminal 2101 through the DCI. In an embodiment, the DCI may contain at least one of information indicating whether to request a beam change and information indicating a group to which the changed beam is applied. In an embodiment, whether to request a beam change may be represented as "on," and an indication indicating a group may be represented as "01." A detailed method for indicating whether to request a beam change will be described later.

At operation 2115, the terminal 2101 may transmit at least one of BSI and BRI to the base station 2102 through at least one of xPUCCH and xPUSCH at a subframe n. In an embodiment, the at least one of xPUCCH and xPUSCH may be indicated by the DCI. Such beam information reported may include information about at least one beam, and it may be reported sequentially from the best quality beam.

At operation 2120, the base station 2102 may change a beam applied to transmission of PDCCH and PDSCH at the subframe n+k, based on the information received at operation 2115, since the beam change indication is "on" in the DCI transmitted at operation 2110 and since the corresponding channels are PDCCH and PDSCH as shown in Table 8. In another embodiment, the base station may perform the beam change only when at least one of BRSRP and BRRSRP of the corresponding beam is better than a threshold value for controlling the beam change in comparison with a currently used beam, based on the received beam information. The k value and the threshold value may be determined using the above-described methods. At operation 2125, the terminal 2101 may perform the beam change at the subframe n+k, based on the information transmitted at operation 2115. The beam change of the terminal 2101 may be also determined based on the threshold value. In an embodiment, the beam change may be performed, for example, but not limited to, simultaneously by the base station and the terminal at the corresponding subframe. The beam change may be performed so that signals are transmitted and received through the changed beam at or after the subframe n+k.

At operation 2130, the base station 2102 may transmit a signal including PDCCH and PDSCH to the terminal 2101 through the changed beam.

Also, at operation 2130, the terminal 2101 may receive the signal including PDCCH and PDSCH through the changed beam, and specifically, may receive the signal through the beam reported at operation 2115 at or after the subframe n+k.

In case of any non-indicated channel, signals may be transmitted and received by maintaining a beam used previously.

Also, if there is a transmission error of information related to the beam change in embodiments, the following operation may be performed.

In case BSI/BRI request information sent by the base station is missing

In an embodiment, if a signal is not received from the terminal at the time the base station receives a report from the terminal according to the BSI/BRI request, the base station may retransmit the BSI/BRI request to the terminal. Then, if the BSI/BRI report is received in response to the retransmission of the request, the base station may determine the report time point as the subframe n and perform the beam change based on this determination.

In case BSI/BRI request is known incorrectly (false alarm case):

If any non-requested BSI/BRI report is received from the terminal, the base station may transmit the DCI containing the BSI/BRI request before the beam change time point (e.g., before k subframes). The terminal that receives the DCI may operate to ignore the previous message for the beam change. In another embodiment, if the beam change is not required, the base station may transmit the beam change request indication information to be set as "off" in the DCI. Also, when beam change is required, the base station may transmit the beam change request indication information to be set as "on."

In case BSI/BRI request information sent by the terminal is missing:

In an embodiment, if a report for the BSI/BRI request sent by the base station is not received at a predetermined time point, the base station may retransmit the BSI/BRI request to the terminal. Then the base station may reset the report time point of BSI/BRI as the subframe n. Such error handling cases may be similarly applied throughout the automatic beam changing scheme.

Figure 22:
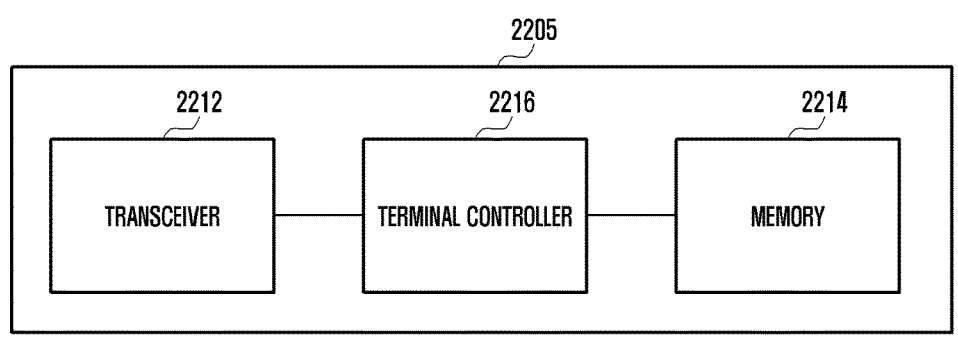
FIG. 22 is a diagram illustrating a terminal according to an embodiment of the present disclosure.

FIG. 22 is a diagram illustrating a terminal according to an embodiment of the present disclosure.

Referring to FIG. 22, the terminal 2205 in this embodiment includes a transceiver 2212, a memory 2214, and a terminal controller 2216.

The transceiver 2212 may transmit and receive signals to and from a base station.

The memory 2214 may store at least one of information associated with the terminal 2205 and information transmitted or received through the transceiver 2212.

The terminal controller 2216 may control the overall operation of the terminal 2205, especially, the terminal-related operations discussed in the above embodiments. The terminal controller 2216 may include at least one processor.

Figure 23:
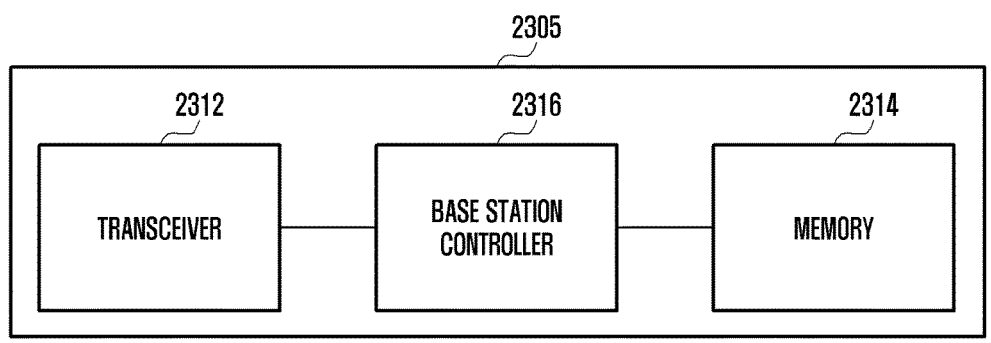
FIG. 23 is a diagram illustrating a base station according to an embodiment of the present disclosure.

FIG. 23 is a diagram illustrating a base station according to an embodiment of the present disclosure.

Referring to FIG. 23, the base station 2305 in this embodiment includes a transceiver 2312, a memory 2314, and a base station controller 2316.

The transceiver 2312 may transmit and receive signals to and from a terminal and any other network entity.

The memory 2314 may store at least one of information associated with the base station 2305 and information transmitted or received through the transceiver 2312.

The base station controller 2316 may control the overall operation of the base station 2305, especially, the base station-related operations discussed in the above embodiments. The base station controller 2316 may include at least one processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A signal transmission and reception method of a terminal of a mobile communication system, the method comprising:
   receiving, from a base station, first information including a request associated with a beam of the terminal;
   transmitting, to the base station, second information associated with the beam in response to the first information;
   identifying at least one of a transmitting (Tx) beam or a receiving (Rx) beam of the terminal associated with the base station based on the first information and the second information; and
   applying the identified at least one of the Tx beam or the Rx beam in response to the receiving of the first information or in response to the transmitting of the second information.

2. The method of claim 1,
   wherein the first information includes beam change indication information of the terminal, and
   wherein the applying of the identified at least one of the Tx beam or the Rx beam comprises:
      applying the identified at least one of the Tx beam or the Rx beam of the terminal associated with the base station based on whether the beam change indication information indicates a beam change.

3. The method of claim 2,
   wherein the first information includes channel information associated with the beam of the terminal, and
   wherein the identifying of the at least one of the Tx beam or the Rx beam comprises:
      identifying the at least one of the Tx beam or the Rx beam of the terminal associated with the base station based on the channel information.

4. The method of claim 1, further comprising:
   receiving, from the base station, a response to the second information at a first subframe,
   wherein the identified at least one of the Tx beam or the Rx beam is applied at a second subframe, and
   wherein information on a relation between the first subframe and the second subframe is received through the first information or a higher layer message.

5. A signal transmission and reception method of a base station of a mobile communication system, the method comprising:
   transmitting, to a terminal, first information including a request associated with a beam of the terminal;
   receiving, from the terminal, second information associated with the beam in response to the first information;
   identifying at least one of a transmitting (Tx) beam or a receiving (Rx) beam of the base station associated with the terminal, based on the first information and the second information; and
   applying the identified at least one of the Tx beam or the Rx beam in response to the transmitting of the first information or in response to the receiving of the second information.

6. The method of claim 5, wherein the first information includes beam change indication information of the base station, and
   wherein the applying of the identified at least one of the Tx beam or the Rx beam comprises:
      applying the identified Tx beam or the Rx beam of the base station associated with the terminal based on whether the beam change indication information indicates a beam change.

7. The method of claim 6,
   further comprising:
      transmitting, to the terminal, a response to the second information at a first subframe,
      wherein the identified at least one of the Tx beam or the Rx beam is applied at a second subframe,
   wherein information on a relation between the first subframe and the second subframe is transmitted through the first information or a higher layer message,
   wherein the first information includes channel information associated with the beam of the base station, and
   wherein the identifying of the at least one of the Tx beam or the Rx beam comprises: identifying the at least one of the Tx beam or the Rx beam of the base station associated with the terminal based on the channel information.

8. A terminal of a mobile communication system, the terminal comprising:
   a transceiver; and
   at least one processor coupled with the transceiver and configured to:
      receive, from a base station, first information including a request associated with a beam of the terminal,
      transmit, to the base station, second information associated with the beam in response to the first information,
      identify at least one of a transmitting (Tx) beam or a receiving (Rx) beam of the terminal associated with the base station based on the first information and the second information, and
      apply the identified at least one of the Tx beam or the Rx beam in response to the receiving of the first information or in response to the transmitting of the second information.

9. The terminal of claim 8, wherein the first information includes beam change indication information of the terminal, and
   wherein the at least one processor is further configured to:
      apply the identified at least one of the Tx beam or the Rx beam of the terminal associated with the base station based on whether the beam change indication information indicates a beam change.

10. The terminal of claim 9,
wherein the first information includes channel information associated with the beam of the terminal, and
wherein the at least one processor is further configured to:
identify the at least one of a the Tx beam or the Rx beam of the terminal associated with the base station based on the channel information.

11. The terminal of claim 8,
wherein the at least one processor is further configured to:
receive, from the base station, a response to the second information at a first subframe,
wherein the identified at least one of the Tx beam or the Rx beam is applied at a second subframe, and
wherein information on a relation between the first subframe and the second subframe is received through the first information or a higher layer message.

12. A base station of a mobile communication system, the base station comprising:
a transceiver; and
at least one processor coupled with the transceiver and configured to:
transmit, to a terminal, first information including a request associated with a beam of the terminal,
receive, from the terminal, second information associated with the beam in response to the first information,
identifying at least one of a transmitting (Tx) beam or a receiving (Rx) beam of the base station associated with the terminal based on the first information and the second information, and
apply the identified at least one of the Tx beam or the Rx beam in response to the transmitting of the first information or in response to the receiving of the second information.

13. The base station of claim 12, wherein the first information includes beam change indication information of the base station,
wherein the first information includes channel information associated with the beam of the base station, and
wherein the at least one processor is further configured to:
identify the at least one of the Tx beam or the Rx beam of the base station associated with the terminal based on the channel information.

14. The base station of claim 12, wherein the second information includes beam change indication information of the terminal, and
wherein the at least one processor is further configured to apply the identified at least one of the Tx beam or the Rx beam of the base station associated with the terminal based on whether the beam change indication information indicates a beam change.

15. The base station of claim 12, wherein the processor is further configured to:
transmit, to the terminal, a response to the second information at a first subframe,
wherein the identified at least one of the Tx beam or the Rx beam is applied at a second subframe, and
wherein information on a relation between the first subframe and the second subframe is transmitted through the first information or a higher layer message.

* * * * *